United States Patent [19]
Ceshkovsky

[11] Patent Number: 5,689,485
[45] Date of Patent: Nov. 18, 1997

[54] TRACKING CONTROL APPARATUS AND METHOD

[75] Inventor: Ludwig Ceshkovsky, Fountain Valley, Calif.

[73] Assignee: Discovision Associates, Irvine, Calif.

[21] Appl. No.: 625,273

[22] Filed: Apr. 1, 1996

[51] Int. Cl.$^6$ .................................................. G11B 7/095
[52] U.S. Cl. .................................. 369/44.13; 369/44.29; 369/44.35
[58] Field of Search .................... 369/44.13, 44.25, 369/44.29, 44.35, 44.32, 44.34, 44.41, 44.28

[56] References Cited

U.S. PATENT DOCUMENTS

| | | | |
|---|---|---|---|
| Re. 32,051 | 12/1985 | Ceshkovsky et al. | 369/44 |
| Re. 32,431 | 6/1987 | Dakin et al. | 358/338 |
| Re. 32,574 | 1/1988 | Ceshkovsky et al. | 369/32 |
| Re. 32,709 | 7/1988 | Ceshkovsky et al. | 178/6.6 R |
| 3,530,258 | 9/1970 | Gregg et al. | 179/100.3 |
| 3,633,038 | 1/1972 | Falk | 250/231 R |
| 3,794,410 | 2/1974 | Elliott | 350/285 |
| 3,829,622 | 8/1974 | Elliot | 179/100.3 V |
| 3,908,076 | 9/1975 | Broadbent | 178/6.7 A |
| 3,908,080 | 9/1975 | Broadbent | 178/6.6 R |
| 3,914,541 | 10/1975 | Elliott | 178/6.6 R |
| 3,924,062 | 12/1975 | Broadbent | 178/6.6 R |
| 3,932,700 | 1/1976 | Snopko | 178/6.6 R |

(List continued on next page.)

FOREIGN PATENT DOCUMENTS

| | | |
|---|---|---|
| 056256 | 4/1983 | Japan . |
| 59-068829 | 4/1984 | Japan . |
| 185071 | 10/1984 | Japan . |
| 1687656 | 7/1991 | Japan . |

OTHER PUBLICATIONS

Elliman, DG & PJ Connor, "Orientation and Scale Invariant Symbol Recognition Using a Hidden Markov Model," University of Nottingham, United Kingdom, 1993(?) pp. 331–334.

Dean, Mark E., David L. Dill & Mark Horowitz, "Self-Timed Logic Using Current-Sensing Completion Detection (CSCD)," Computer Systems Laboratory, Stanford University, CA, IEEE, 1991, pp. 187–191.

Wong, Bennett C. & Henry Samueli, "A 200–MHz All-Digital QAM Modulator and Demodulator in 1.2-m CMOS for Digital Radio Applications," IEEE Journal of Solid-State Circuits, vol. 26, No. 12, Dec. 1991, pp. 1971–1983.

Samueli, Henry, Charles P. Reames, Leo Mritreuil & William E. Wall, "Performance Results of a 64/256–QAM CATV Receiver Chip Set," Broadcom Corp., Los Angeles, CA & Scientific–Atlanta Inc., Norcross, GA.

*Primary Examiner*—Thang V. Tran
*Attorney, Agent, or Firm*—Ronald J. Clark; Robert T. Braun; Arthur S. Bickel

[57] ABSTRACT

An apparatus is disclosed for control of a beam of radiant energy, wherein a detector of the beam has first and second outputs responsive to a position of the beam. A circuit is coupled to the outputs of the detector for producing an error signal representing a displacement of the beam from a predetermined position, wherein the error signal has a periodic characteristic relative to the displacement. A servo responsive to the error signal restores the displaced beam to the predetermined position. A local feedback loop is coupled to the outputs of the detector, and includes first and second periodic function generators, each responsive to the error signal. The second periodic function generator has an output that differs from an output of the first periodic function generator by a phase angle, preferably 90 degrees. A first multiplier multiplies the first output of the detector by the output of the first periodic function generator. A second multiplier multiplies the second output of the detector by the output of the second periodic function generator, wherein the outputs of the first and second multipliers are provided as inputs of the circuit to modify the error signal.

30 Claims, 10 Drawing Sheets

U.S. PATENT DOCUMENTS

| | | | |
|---|---|---|---|
| 3,944,727 | 3/1976 | Elliott | 178/6.6 R |
| 3,997,715 | 12/1976 | Elliott | 178/6.6 DD |
| 4,118,735 | 10/1978 | Wilkinson | 358/128 |
| 4,152,586 | 5/1979 | Elliott et al. | 250/201 |
| 4,161,752 | 7/1979 | Basilico | 358/128 |
| 4,161,753 | 7/1979 | Bailey et al. | 358/128 |
| 4,190,860 | 2/1980 | Somers et al. | 358/128.5 |
| 4,225,873 | 9/1980 | Winslow | 346/76 L |
| 4,228,326 | 10/1980 | Dakin et al. | 179/100.1 |
| 4,232,201 | 11/1980 | Canino | 179/100.1 |
| 4,232,337 | 11/1980 | Winslow et al. | 358/128.5 |
| 4,234,837 | 11/1980 | Winslow | 318/577 |
| 4,236,105 | 11/1980 | Wilkinson | 318/577 |
| 4,239,942 | 12/1980 | Van Alem et al. | 179/100.1 G |
| 4,252,327 | 2/1981 | Elliott et al. | 364/213 |
| 4,271,334 | 6/1981 | Yardy | 369/44.13 |
| 4,282,598 | 8/1981 | Elliott | 369/44 |
| 4,310,919 | 1/1982 | Slaten | 369/275 |
| 4,322,837 | 3/1982 | Mickelson et al. | 369/44 |
| 4,337,534 | 6/1982 | Basilico et al. | 369/111 |
| 4,337,538 | 6/1982 | Wilkinson et al. | 369/223 |
| 4,340,955 | 7/1982 | Elliott | 369/213 |
| 4,347,599 | 8/1982 | Vitale | 369/270 |
| 4,353,090 | 10/1982 | Broadbent | 358/342 |
| 4,357,533 | 11/1982 | Winslow | 250/204 |
| 4,358,774 | 11/1982 | Wilkinson | 346/1.1 |
| 4,358,796 | 11/1982 | Ceshkovsky et al. | 358/322 |
| 4,358,802 | 11/1982 | Jarsen | 360/99 |
| 4,367,545 | 1/1983 | Elliott | 369/213 |
| 4,370,679 | 1/1983 | Ceshkovsky et al. | 358/318 |
| 4,371,899 | 2/1983 | Ceshkovsky et al. | 358/315 |
| 4,374,323 | 2/1983 | Winslow et al. | 250/201 |
| 4,375,091 | 2/1983 | Dakin et al. | 369/32 |
| 4,397,805 | 8/1983 | Holmes | 264/328.14 |
| 4,406,000 | 9/1983 | Shoji et al. | 369/44 |
| 4,412,743 | 11/1983 | Eberly | 356/237 |
| 4,414,655 | 11/1983 | Shoji et al. | 369/44 |
| 4,439,848 | 3/1984 | Ceshkovsky et al. | 369/45 |
| 4,445,144 | 4/1984 | Giddings | 358/342 |
| 4,445,209 | 4/1984 | Mickelson et al. | 369/45 |
| 4,450,488 | 5/1984 | Golding | 358/342 |
| 4,451,913 | 5/1984 | Elliott | 369/110 |
| 4,456,914 | 6/1984 | Winslow | 346/76 L |
| 4,463,389 | 7/1984 | Golding | 358/343 |
| 4,465,977 | 8/1984 | Lopez de Romana | 328/120 |
| 4,467,467 | 8/1984 | Wilkinson et al. | 369/111 |
| 4,477,890 | 10/1984 | Mooney et al. | 369/53 |
| 4,481,613 | 11/1984 | Yokota | 369/56 |
| 4,482,989 | 11/1984 | Bierhoff | 369/44.13 |
| 4,488,279 | 12/1984 | Wilkinson et al. | 369/54 |
| 4,492,992 | 1/1985 | Rooney et al. | 360/73 |
| 4,499,569 | 2/1985 | Lopez De Romana | 369/45 |
| 4,504,939 | 3/1985 | Eberly | 369/46 |
| 4,514,771 | 4/1985 | Stark et al. | 360/73 |
| 4,516,177 | 5/1985 | Moon et al. | 360/77 |
| 4,519,004 | 5/1985 | Wilkinson et al. | 358/342 |
| 4,530,018 | 7/1985 | Hoshino et al. | 360/73 |
| 4,530,083 | 7/1985 | Ishihara | 369/267 |
| 4,536,863 | 8/1985 | Giddings | 369/43 |
| 4,566,090 | 1/1986 | Eberly | 369/46 |
| 4,571,712 | 2/1986 | Romano et al. | 369/44 |
| 4,571,716 | 2/1986 | Szerlip | 369/54 |
| 4,583,131 | 4/1986 | Dakin | 358/342 |
| 4,583,210 | 4/1986 | Winslow | 369/54 |
| 4,590,527 | 5/1986 | Warner | 360/78 |
| 4,607,157 | 8/1986 | Millar et al. | 250/201 |
| 4,607,956 | 8/1986 | Ishihara et al. | 356/375 |
| 4,611,318 | 9/1986 | Winslow | 369/54 |
| 4,638,377 | 1/1987 | Dakin | 358/343 |
| 4,648,084 | 3/1987 | Eberly | 369/46 |
| 4,700,334 | 10/1987 | Shinkai | 369/44 |
| 4,701,898 | 10/1987 | Giddings | 369/32 |
| 4,703,368 | 10/1987 | Dakin | 358/342 |
| 4,703,467 | 10/1987 | Elliott | 369/44 |
| 4,706,133 | 11/1987 | Giddings | 358/342 |
| 4,727,433 | 2/1988 | Dakin | 358/343 |
| 4,727,532 | 2/1988 | Giddings | 369/43 |
| 4,751,692 | 6/1988 | Giddings | 369/32 |
| 4,757,393 | 7/1988 | Dakin et al. | 358/342 |
| 4,759,007 | 7/1988 | Eberly | 369/58 |
| 4,774,699 | 9/1988 | Giddings | 369/32 |
| 4,779,251 | 10/1988 | Burroughs | 358/342 |
| 4,791,289 | 12/1988 | Watanabe et al. | 250/237 G |
| 4,796,098 | 1/1989 | Giddings | 358/342 |
| 4,797,866 | 1/1989 | Yoshikawa | 369/43 |
| 4,809,247 | 2/1989 | Elliott | 369/44 |
| 4,845,697 | 7/1989 | Giddings | 369/32 |
| 4,853,918 | 8/1989 | Kobayashi et al. | 369/44 |
| 4,855,978 | 8/1989 | Kanamaru | 369/32 |
| 4,866,695 | 9/1989 | Suzuki et al. | 369/266 |
| 4,893,297 | 1/1990 | Gregg | 369/275 |
| 4,924,455 | 5/1990 | Fujiie et al. | 369/44.21 |
| 4,939,712 | 7/1990 | Abe et al. | 369/32 |
| 4,950,890 | 8/1990 | Gelbart | 250/237 G |
| 4,980,876 | 12/1990 | Abate et al. | 369/44.11 |
| 4,980,878 | 12/1990 | Szerlip | 369/54 |
| 5,012,363 | 4/1991 | Mine et al. | 360/77.05 |
| 5,018,020 | 5/1991 | Dakin | 358/310 |
| 5,031,165 | 7/1991 | Fujita | 369/44.13 |
| 5,036,506 | 7/1991 | Bierhoff | 369/44.28 |
| 5,079,756 | 1/1992 | Kuwabara | 369/44.28 |
| 5,086,419 | 2/1992 | Yanagi | 369/32 |
| 5,087,973 | 2/1992 | Citta et al. | |
| 5,124,964 | 6/1992 | Hayashi | 369/44.11 |
| 5,138,592 | 8/1992 | Fujita | 369/44.13 |
| 5,146,442 | 9/1992 | Shikichi | 369/44.29 |
| 5,168,356 | 12/1992 | Acampora et al. | 358/133 |
| 5,168,486 | 12/1992 | Yanagawa | 369/44.14 |
| 5,170,386 | 12/1992 | Tateishi | 369/50 |
| 5,177,725 | 1/1993 | Terashi | 369/44.29 |
| 5,179,485 | 1/1993 | Tamayama | 360/106 |
| 5,189,293 | 2/1993 | Leenknegt | 250/201.5 |
| 5,210,726 | 5/1993 | Jackson et al. | 369/32 |
| 5,216,647 | 6/1993 | Kitani | 369/44.28 |
| 5,218,588 | 6/1993 | Suzuki | 369/44.27 |
| 5,247,501 | 9/1993 | Hashimoto et al. | 369/44.11 |
| 5,257,251 | 10/1993 | Chow et al. | 369/44.25 |
| 5,267,226 | 11/1993 | Matsuoka et al. | 369/44.11 |
| 5,270,886 | 12/1993 | Nigam | 360/78.05 |
| 5,294,894 | 3/1994 | Gebara | 331/1 A |
| 5,304,953 | 4/1994 | Heim et al. | 331/1 A |
| 5,315,372 | 5/1994 | Tsai | 356/358 |
| 5,315,571 | 5/1994 | Maeda et al. | 369/50 |
| 5,319,622 | 6/1994 | Martin | 369/44.14 |
| 5,327,407 | 7/1994 | Suzuki et al. | 369/44.25 |
| 5,379,282 | 1/1995 | Wachi | 369/44.35 |
| 5,394,385 | 2/1995 | Sakurada et al. | 369/44.23 |
| 5,396,477 | 3/1995 | Matsumoto et al. | 369/44.28 |
| 5,459,309 | 10/1995 | Kagami et al. | 250/201.5 |

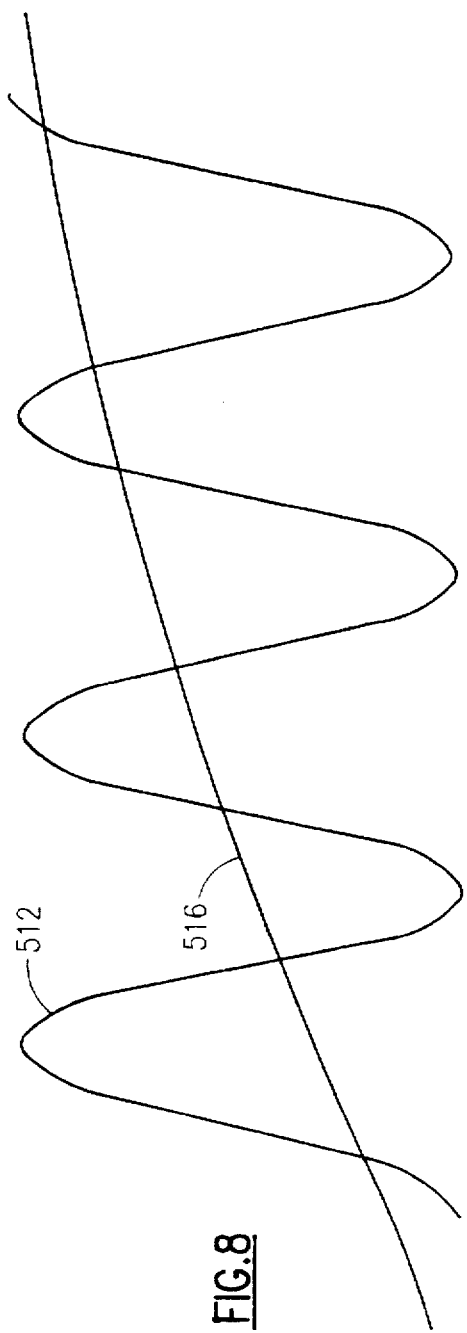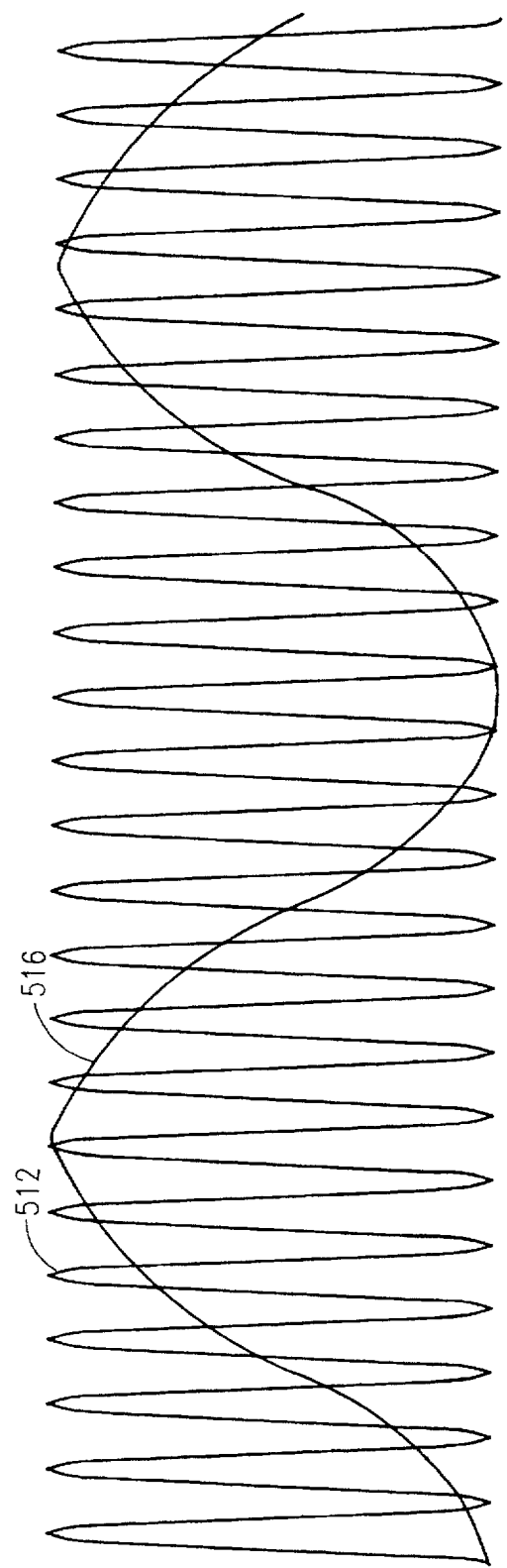

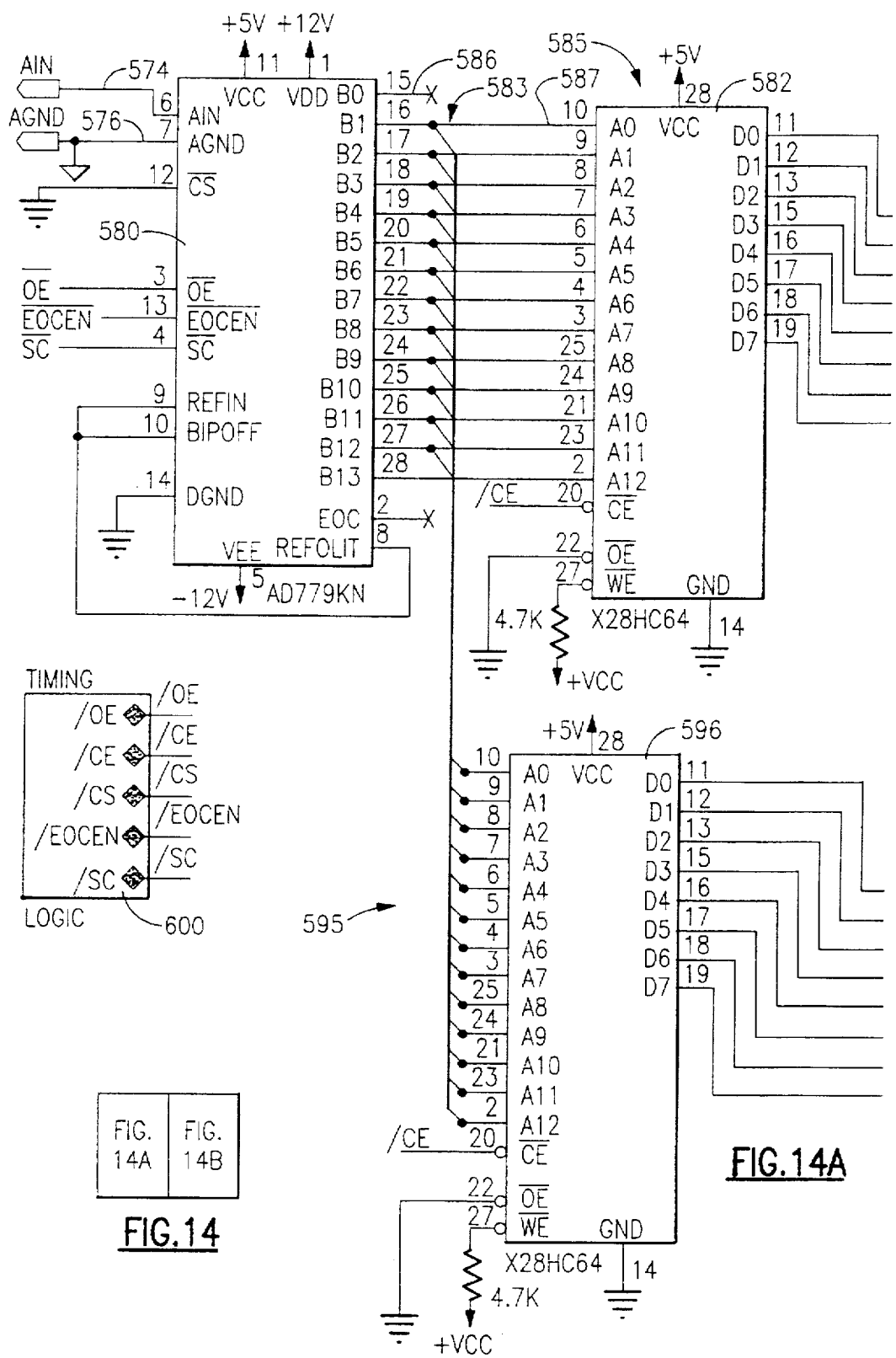

TRACKING CONTROL APPARATUS AND METHOD

BACKGROUND OF THE INVENTION

1. Field of the Invention

This invention relates to a tracking control arrangements for optical disc drives. More particularly this invention relates to an improved servo control which extends the operating range of a closed loop mode of operation of a tracking servo to a plurality of information tracks on a disc.

2. Description of the Related Art

In optical disc drives wherein information is stored in a plurality of spiral or concentric information tracks, a lock of a recording or reproducing beam on an information track of interest is commonly maintained by a tracking servo, for example the servo disclosed in Ceshkovsky et al., U.S. Pat. No. 4,332,022. The tracking servo responds to minimize a tracking error signal $V_p$ derived from the intensity of a reflected light beam returning from the optical disk medium and is given by the equation:

$$V_p = A \sin\left(2\pi \frac{x}{p}\right) \quad (1)$$

where

A is a constant;

x is beam displacement from the track center; and p is the track pitch.

It is often necessary to rapidly move the recording or reproducing beam rapidly in the radial direction of the disc from a first information track to a second information track. While this can be done by opening the servo loop, this is undesirable for reasons of impaired stability of the tracking system, and because time is lost in reacquiring a lock on the new information track.

Consequently the Art has attempted to find ways of maintaining closed loop operation of a servo while displacing a light beam from a first region of interest to a second region of interest. Copending applications of the inventor, Ser. No. 08/569,420, and Ser. No. 08/474,424, disclose techniques and apparatus for operating a servo so as to displace a light beam or its focal point from a first discrete region of interest to a second discrete region of interest while operating in closed loop mode.

Suzuki et al., U.S. Pat. No. 5,327,407 proposes apparatus for changing a tracking error signal having a sinusoidal characteristic representing a relative position of a light beam to a sawtooth waveform representing the relative position.

In Chow et al., U.S. Pat. No. 5,257,251 it is proposed to perform track seeking utilizing a single servo loop, wherein the dynamic range of the position error signal is changed and processed by means for receiving the altered error signal and generating a servo drive signal.

Terashi, U.S. Pat. No. 5,177,725, discloses a servo apparatus for expanding the pull-in range using a velocity detector for detecting the velocity of a driven element.

Kuwabara, U.S. Pat. No. 5,079,756, proposes another approach to switching tracks on a disc medium using closed loop servo operation, wherein a plurality of signals varying in phase are successively switched into a tracking device circuit to effect a track jump.

Kobayashi et al, U.S. Pat. No. 4,853,918, proposes an arrangement where signals from tracking pits offset from each other about the center of a track are provided to sample-and-hold circuits, and are compared with one another to yield a sawtooth signal tracking signal having discontinuities midway between tracks.

In Burroughs, U.S. Pat. No. 4,779,251 an arrangement is disclosed wherein a circuit generates a ramp waveform that is used to introduce a controlled offset into a tracking servo. The servo error signal, which is derived from pre-formatted fine tracking features, is inverted in phase when the read beam is moving between tracks. The amp waveform is adjusted according to memorized tracking error information from previous microjumps between tracks.

SUMMARY OF THE INVENTION

It is a primary object of the present invention to extend the operating range of a tracking servo, operating in a closed loop mode, beyond the conventional one quarter to one half track range.

It is another object of the invention to improve the tracking servo's performance and response to disc defects, noise, shock and vibration.

These and other objects of the present invention are attained in an optical disc drive by providing an optical pickup having a plurality of outputs for producing an error signal that supplies a servo loop. The error signal also supplies a local feedback loop, which includes a plurality of sine function generators to modify the outputs of the optical pickup, such that the tracking error signal, plotted against the radial position of the read beam, is transformed from a sinusoidal waveform into a substantially linear amp. The operating range of the amp extends over two or more information tracks on the disc. The local feedback loop is independent of the main tracking servo loop, although it may be designed to share some components.

In addition to the sine function generators, the local feedback loop comprises two multipliers, a difference summing amplifier, a local loop gain element, a phase compensator, and a summing circuit to add a phase shift value to one of the two sine function generator inputs.

The invention provides an apparatus for control of a beam of radiant energy, wherein a detector of the beam has first and second outputs responsive to a position of the beam. A circuit is coupled to the outputs of the detector for producing an error signal representing a displacement of the beam from a predetermined position, wherein the error signal has a periodic characteristic relative to the displacement. A servo responsive to the error signal restores the displaced beam to the predetermined position. A local feedback loop is coupled to the outputs of the detector, and includes first and second periodic function generators, each responsive to the error signal. The second periodic function generator has an output that differs from an output of the first periodic function generator by a phase angle, preferably 90 degrees. A first multiplier multiplies the first output of the detector by the output of the first periodic function generator. A second multiplier multiplies the second output of the detector by the output of the second periodic function generator, wherein the outputs of the first and second multipliers are provided as inputs of the circuit to modify the error signal.

In an aspect of the invention the periodic characteristic is substantially sinusoidal, and the first periodic function generator and the second periodic function generator are sine generators.

Preferably the first and second outputs of the detector have an approximate mutual quadrature relationship with respect to the displacement of the beam, and the phase angle is approximately ninety degrees. The phase angle can be in a range of approximately 60 degrees to approximately 120 degrees. The detector may include an interferometer.

The invention provides a method for controlling of a beam of radiant energy. It is performed by generating first and second detection signals responsive to a position of the beam; producing an error signal representing a displacement of the beam from a predetermined position, wherein the error signal has a periodic characteristic relative to the displacement; restoring the displaced beam to the predetermined position in response to the error signal; and generating first and second periodic signals. The second periodic signal differs from the first periodic signal by a phase angle which is preferably 90 degrees. The error signal is produced by multiplying the first detection signal by the first periodic signal to yield a first product signal, multiplying the second detection signal by the second periodic signal to yield a second product signal, and determining the difference between the first product signal and the second product signal.

In a tracking control apparatus for an optical disc system, a source directs a beam of radiant energy toward a selected track of an optical disc. There are means for imparting relative rotational motion between the beam and the disc about an axis of rotation, a beam steering means for displacing the beam in a generally radial direction relative the disc, such that the beam follows the selected information track. A detector is responsive to radiant energy returning from the selected information track and has a first output signal and a second output signal, wherein the first output signal differs in phase from the second output signal according to a displacement of the beam from the selected track. A first multiplier has a first input electrically coupled to the first output signal of the detector. A second multiplier has a first input electrically coupled to the second output signal of the detector. A difference summing amplifier has a first input coupled to an output of the first multiplier and a second input coupled to an output of the second multiplier for generating an error signal. A first periodic function generator has an input coupled to an output of the difference summing amplifier and an output coupled to a second input of the first multiplier. A second periodic function generator has an input coupled to an output of the difference summing amplifier and an output coupled to a second input of the second multiplier. A servo is responsive to the output of the difference summing amplifier for operating the beam steering means.

In one aspect of the invention there is a loop gain amplifier coupled to the output of the difference summing amplifier generating an amplified error signal A feedback loop compensation circuit coupled to the loop gain amplifier provides phase gain compensation for the amplified error signal. There is a phase shifter coupled to the loop compensation circuit and coupled to either the first periodic function generator or the second periodic function generator, wherein the phase shifter provides a predetermined voltage offset to the error signal.

The invention provides a method for tracking control in an optical disc system. It is performed by directing a beam of radiant energy toward a selected one of a plurality of information tracks of an optical disc, imparting relative rotational motion between the beam and the disc about an axis of rotation, displacing the beam in a generally radial direction relative the disc to follow the selected information track, and detecting radiant energy returning from the selected information track. A first output signal and a second output signal are generated, wherein the first output signal differs in phase from the second output signal according to a displacement of the beam from the selected track. The method further includes multiplying the first output signal by a first periodic function of an error signal to yield a first product, multiplying the second output signal by a second periodic function of the error signal to yield a second product, subtracting the first product from the second product to produce the error signal, and steering the beam toward the selected information track in accordance with the error signal.

BRIEF DESCRIPTION OF THE DRAWING

For a better understanding of these and other objects of the present invention, reference is made to the detailed description of the invention, by way of example, which is to be read in conjunction with the following drawings, wherein:

FIGS. 8 and 9 are electrical waveforms which are helpful in understanding the invention;

DESCRIPTION OF THE PREFERRED EMBODIMENT

Figure 1:
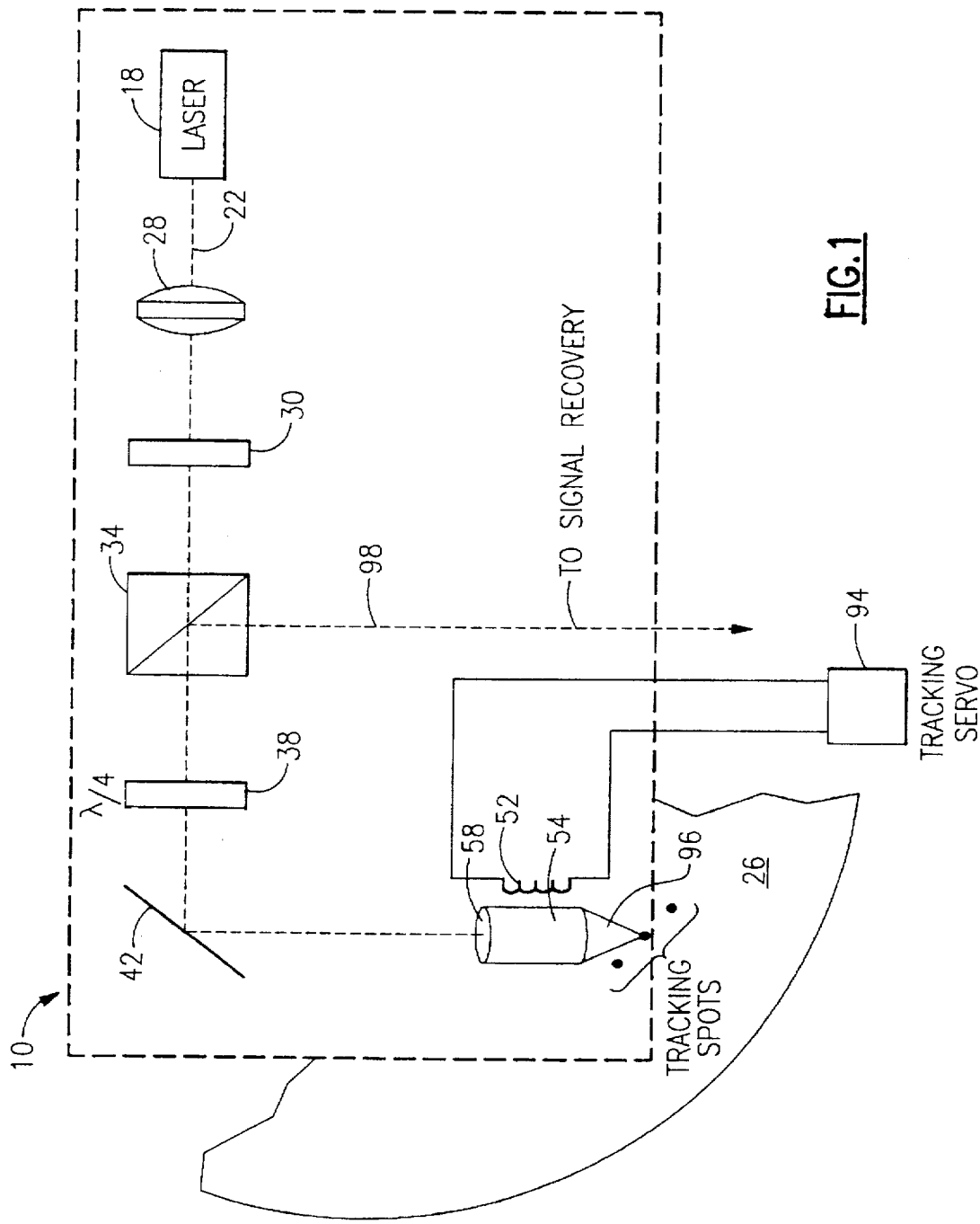
FIG. 1 is a schematic diagram of an apparatus in accordance with the invention.

An optical system 10 of a disc player for information media such as video discs, magneto-optical discs, audio discs, and computer data discs, collectively referred to herein as an "optical disc", is shown in FIG. 1. The optical system 10 includes a laser 18, employed for generating a read beam 22 which is used for reading an encoded signal stored on an optical disc 26, a first lens 28, a diffraction grating 30, a beam splitting prism 34 and a quarter wave plate 38. The optical system 10 further includes a mirror 42, and an objective lens 54 having an entrance aperture 58. The beam reaching the optical disc 26 is movable in a radial direction by known beam displacement means, indicated symbolically by inductor 52. In practice the inductor 50 is controlled by a tracking servo 94.

Figure 2:
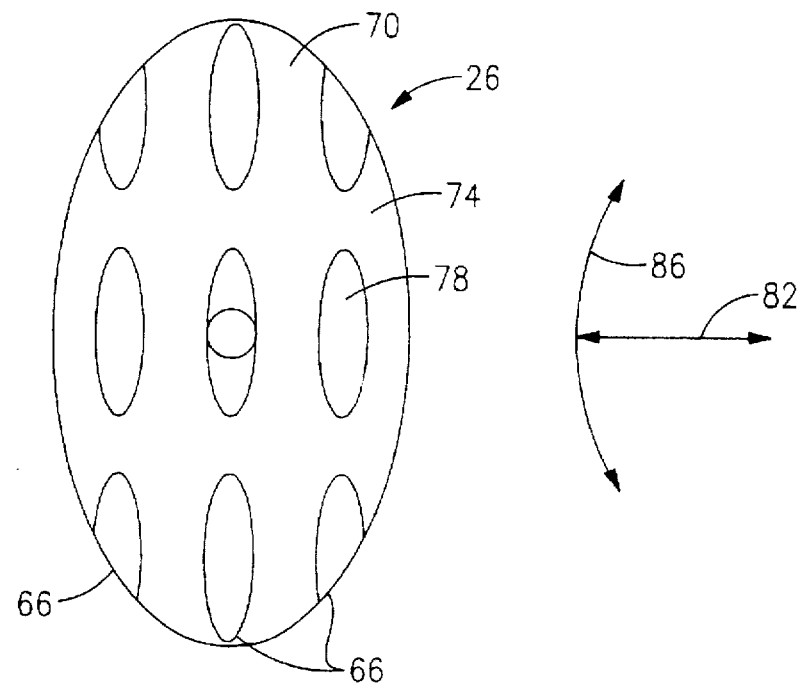
FIG. 2 is a fragmentary view of the surface of a tracked optical recording medium.

An enlarged portion of the optical disc 26 is shown in FIG. 2. The optical disc 26 includes a plurality of information tracks 66 formed on an information bearing surface 70. Each information track 66 comprises a succession of light reflective regions 74 and light non-reflective regions 78. The light reflective regions 74 have generally planar, highly polished surfaces, such as a thin aluminum layer. The light non-reflective regions 78 are generally light scattering surfaces and appear as bumps or elevations above the planar surface representing the light reflective regions 74. The read beam 22 has one or more degrees of movement with respect to the information bearing surface 70 of the optical disc 26, one of which is in the radial direction as indicated by the double headed arrow 82.

The read beam 22 generated by the laser 18 first passes through the first lens 28, which is employed for shaping the read beam 22 to have a size which fully fills the entrance aperture 58 of the objective lens 54. After the read beam 22 is properly shaped by the first lens 28, it passes through the diffraction grating 30 which splits the read beam 22 into three separate beams (not shown). Two of the beams are employed for developing a radial tracking error signal and the other is used for developing both a focus error signal and an information signal. The three beams are treated identically by the remaining portion of the optical system 10. Therefore, they are collectively referred to as the read beam 22. The output of the diffraction grating 30 is applied to the beam splitting prism 34. The axis of the prism 34 is slightly offset from the path of the read beam 22, the reasons for which are explained more fully in U.S. Pat. No. Re. 32,709, issued on Jul. 5, 1988, the entire text of which is hereby incorporated by reference.

The transmitted portion of the read beam 22 is applied through the quarter wave plate 38 which provides a forty-five degree shift in polarization of the light forming the read beam 22. The read beam 22 next impinges upon the mirror 42 which redirects the read beam 22 to the objective lens 54.

It is the function of the servo subsystem 94 to direct the point of impingement of the read beam 22 on the information bearing surface 70 of the optical disc 26 so as to radially track the information carrying indicia on the surface 70 of the optical disc 26. This is done by driving the inductor 52 to respond to an error signal, so that the point of impingement of the read beam 22 is directed to a desired position in a radial direction over the surface 70 of the optical disc 26 as indicated by the arrow 86 shown in FIG. 2.

After the read beam 22 is reflected from the mirror 42 as reflected beam 96, it impinges upon the entrance aperture 58 of the objective lens 54 and is focused to a spot upon one of the information bearing tracks 66 of the optical disc 26 by the lens 54. The objective lens 54 is used to shape the read beam 22 into a spot of light having a desired size at the point at which the read beam 22 impinges upon the information bearing surface 70 of the optical disc 26. It is desirable to have the read beam 22 completely fill the entrance aperture 58 as this results in a high light intensity at the point of impingement with the disc 26.

The optical system 10 thus directs the read beam 22 to the optical disc 26 and focuses the read beam 22 down to a spot at its point of impingement with the optical disc 26. In normal playing mode, the focused read beam 22 impinges upon successively positioned light reflective regions 74 and light non-reflective regions 78 representing the information stored on the disc 26. The reflected light is gathered by the objective lens 54 to create a reflected portion of the read beam. The reflected beam 96 retraces the same path previously explained by impinging in sequence upon the mirror 42, and the quarterwave plate 38, which provides an additional forty five degree polarization shift resulting in a cumulative total of one hundred eighty degrees in shift of polarization. The reflected read beam 96 then impinges upon the beam splitting prism 34 which diverts a portion of the reflected read beam 98 to impinge upon a portion Of a signal recovery subsystem 104, which is shown in FIG. 3.

Figure 3:
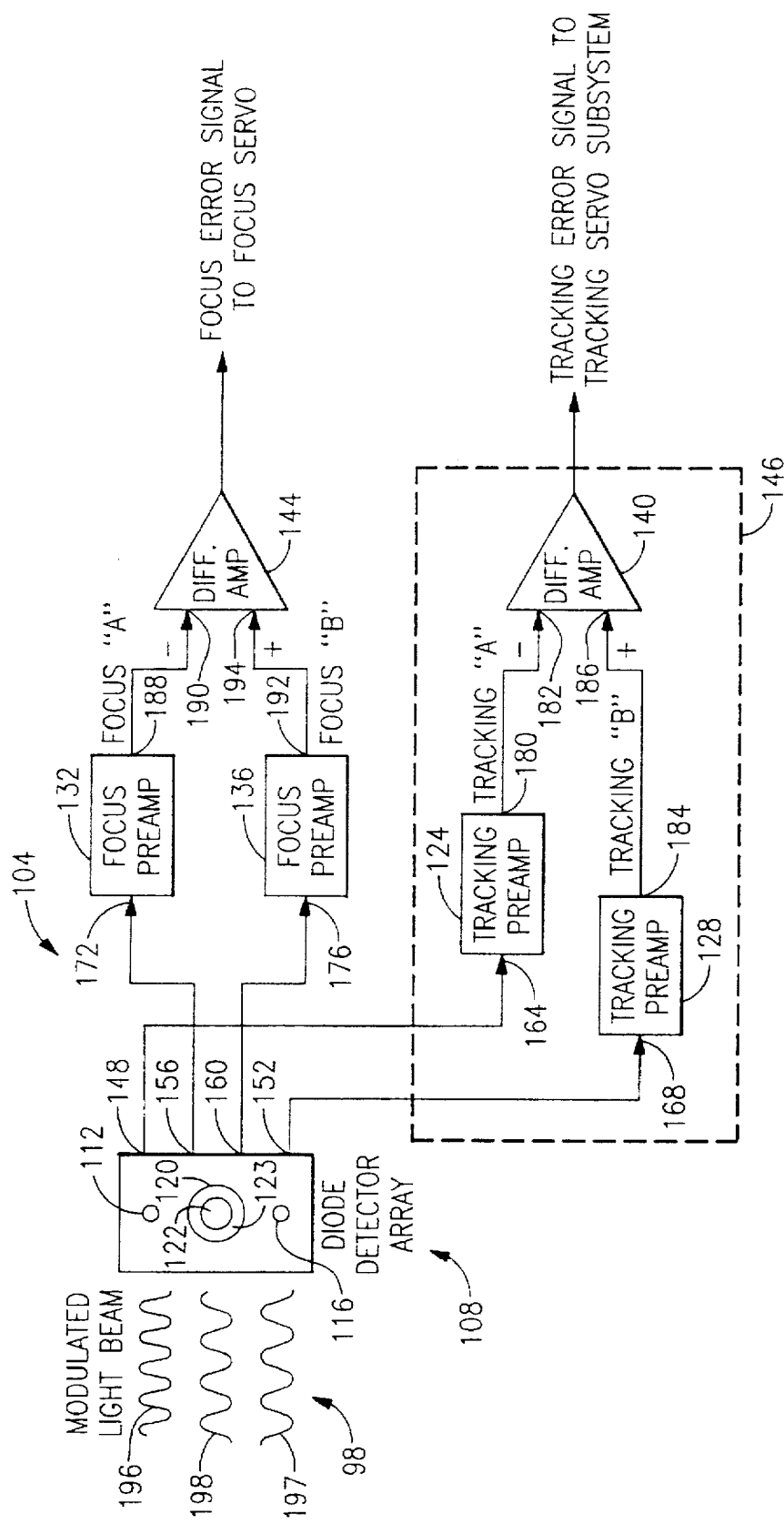
FIG. 3 is a block diagram of a signal recovery subsystem in the apparatus of FIG. 1.

FIG. 3 shows a schematic block diagram of a portion of the signal recovery subsystem 104. The signal recovery subsystem 104 receives the beam 98 and generates a plurality of informational signals. These signals are then provided to various portions of the optical disc player. These informational signals fall generally into two types, an information signal itself which represents stored information and a control signal derived from the informational signal for controlling various parts of the optical disc player. The information signal is a modulated signal representing the information stored on the disc 26 and is provided to a signal processing subsystem (not shown). A first type of control signal generated by the signal recovery subsystem 104 is a differential focus error signal which is provided to a focus servo subsystem (not shown). A second type of control signal generated by the signal recovery subsystem 104 is a differential tracking error signal. The differential tracking error signal is provided to the tracking servo subsystem 94 for driving the inductor 52 to radially displace the read beam 22.

To receive the reflected beam 98, the signal recovery subsystem 104 includes a diode detector array 108 including a first tracking photodetector 112, a second tracking photodetector 116 and a concentric ring detector 120 having both an inner portion 122 and an outer portion 123. The signal recovery subsystem 104 further includes a first tracking preamplifier 124, a second tracking preamplifier 128, a first focus preamplifier 132, a second focus preamplifier 136, a first differential amplifier 140 and a second differential amplifier 144. The first and second tracking preamplifiers 124 and 128, together with the first differential amplifier 140, comprise a tracking signal processing portion 146 of the signal recovery subsystem 104.

The diode detector array 108 has first, second, third and fourth outputs 148, 152, 156 and 160. The first output 148 is electrically connected to an input 164 of the first tracking preamplifier 124, the second output 152 is electrically connected to an input 168 of the second tracking preamplifier 128, the third output 156 is electrically connected to an input 172 of the first focus preamplifier 132 and the fourth output 160 is electrically connected to an input 176 of the second focus preamplifier 136. The first tracking preamplifier 124 has an output 180 which is electrically connected to a first input 182 of the first differential amplifier 140 while the second tracking preamplifier 128 has an output 184 which is electrically connected to a second input 186 of the first differential amplifier 140. The first focus preamplifier 132 has an output 188 which is electrically connected to a first input 190 of the second differential amplifier 144 while the second focus preamplifier 136 has an output 192 which is electrically connected to a second input 194 of the second differential amplifier 144.

The reflected beam 98 comprises three portions: a first tracking beam 196 which impinges upon the first tracking photodetector 112; a second tracking beam 197 which impinges upon the second tracking photodetector 116; and a central information beam 198 which impinges upon the concentric ring detector 120. The signal produced by the first tracking photodetector 112 is provided to the first tracking preamplifier 124 via the first output 148 of the diode detector array 108. The signal produced by the second tracking photodetector 116 is provided to the second tracking preamplifier 128 via the second output 152 of the diode array 108. The signal produced by the inner portion 122 of the concentric ring detector 120 is provided to the first focus preamplifier 132 via the third output 156 of the diode array 108 while the signal produced by the outer portion 123 of the concentric ring detector 120 is provided to the second focus preamplifier 136 via the fourth output 160 of the diode array 108.

The output from the first differential amplifier 140 is a differential tracking error signal which is applied to the tracking servo system 94 which is described in more detail below. The output from the second differential amplifier 144 is a differential focus error signal which is applied to a focus servo system (not shown). Although the invention of the present application is described with reference to the signal recovery subsystem 104 just described, it can also be used with other signal recovery subsystems known in the art.

The function of the tracking servo subsystem 94 is to direct the impingement of the read beam 22 so that it impacts directly upon the center of the information track 66. The read beam 22 is generally the same width as the information bearing sequence of indicia which form the information track 66. Maximum signal recovery is thus achieved when the read beam 22 is caused to travel such that all or most of the beam 22 impinges upon the successively positioned light reflective and light non-reflective regions 74 and 78 of the information track 66. The tracking servo subsystem 94 is sometimes referred to as the radial tracking servo because the departures from the information track 66 most often occur in the radial direction upon the disc surface 70. The radial tracking servo 94 is generally continuously operable in the normal play mode of the optical disc player. The tracking servo subsystem 94 is shown in further detail in FIG. 4 and includes a loop interrupt switch 200 and an amplifier 202 for driving the inductor 52. The loop interrupt switch 200 receives the tracking error signal from the signal recovery subsystem 104 at a first input 204 and receives a loop interrupt signal at a second input 206. When the loop interrupt is not active, the tracking error signal is provided at its output 208. The amplifier 202 receives the tracking error signal at its input 210 and generates a tracking A signal for the inductor 52 at a first output 212 and a tracking B signal for the inductor 52 at a second output 214. Together, the tracking A and tracking B signals control the radial displacement of the read beam 22. When the tracking error signal is received at the input 210 of the amplifier 202, the two tracking signals control the current through the inductor 52 such that the reading beam 22 impinging thereupon is moved in the radial direction and becomes centered on the information track illuminated by the read beam 22. The direction and the amount of movement depends on the polarity and the amplitude of the tracking error signal.

In certain modes of operation, the tracking servo subsystem 94 is interrupted such that the tracking error signal generated from the signal recovery subsystem 104 is not provided to the amplifier 202. One such mode of operation is a search operation, when it is desired to have focused read beam 22 radially traverse a portion of the information bearing portion of the disc 26. In such a mode of operation, an interrupt signal is provided at the second input 206 of the interrupt switch 200 and the tracking servo system 94, causing the switch 200 to prevent the tracking error signal from being provided at its output 208. In addition, in a jump-back mode of operation wherein the focused read beam 22 is caused to jump from one track to an adjacent track, the tracking error signal is not provided to the amplifier 202. In the jump-back mode the amplifier 202 does not provide tracking A and tracking B signals, as they would tend to unsettle the radial beam deflecting means symbolized by the inductor 52, and require a longer period of time for the radial tracking servo subsystem 94 to reacquire proper tracking of the next adjacent information track. Generally, in a mode of operation where the tracking error signal is removed from the amplifier 202, a substitute pulse is generated for giving a clean unambiguous signal to the amplifier 202 to displace the read beam 22 to its next assigned location.

Figure 5:
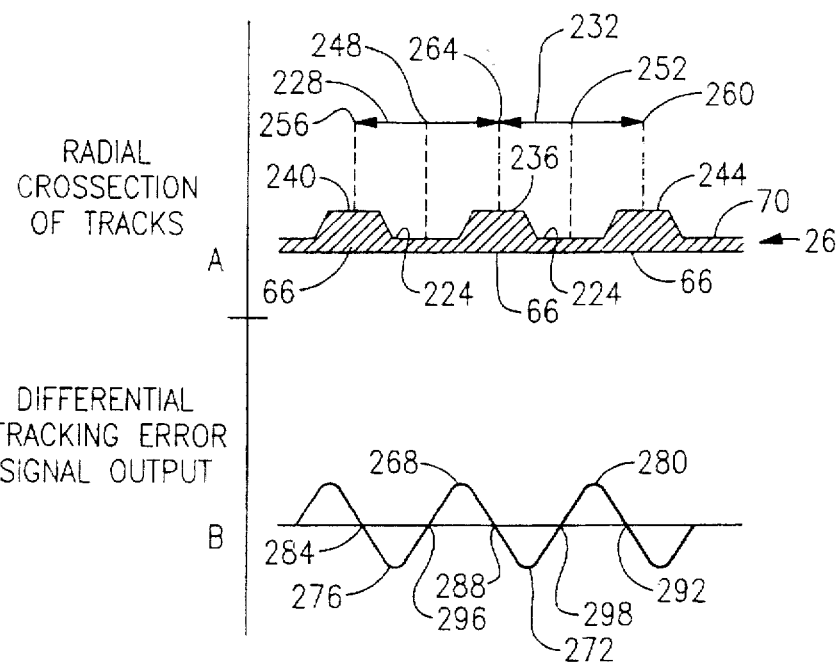
FIG. 5 is a spatial plot of a signal waveform corresponding to tracks on an optical medium.

A cross-sectional view taken in a radial direction across the optical disc 26 is shown in line A of FIG. 5, which shows both a plurality of information tracks 66 and a plurality of intertrack regions 224. The intertrack regions 224 are similar to the light reflective regions 74, shown in FIG. 2. The lengths of the lines indicated at 228 and 232 show the center to center spacing between a center track 236 and an adjacent first track 240 and the center track 236 and an adjacent second track 244, respectively. A point indicated at 248 in the line 228 and a point indicated at 252 in the line 232 represent the crossover points between the central track 236 the adjacent tracks 240 and 244, respectively. The crossover points 248 and 252 are each exactly halfway between the central track 236 and the first and second tracks 240 and 244. A point indicated at 256 on the line 228 represents the center of the first information track 240, while a point indicated at 260 on the line 232 represents the center of the second information track 244. A point indicated at 264 represents the center of the center information track 236.

A typical optical disc contains approximately eleven thousand information tracks per inch. The distance from the center of one information track to the next adjacent information track is in the range of 1.6 microns while the information indicia aligned in a particular information track is approximately 0.5 microns in width. This leaves approximately one micron of empty and open space between the outermost regions of the indicia positioned in adjacent information tracks.

When the read beam 22 strays from the center of the information track 66, the reflected signal received by either the first tracking photodetector 112 or the second tracking photodetector 116 increases in intensity while the reflected signal received by the other tracking photodetector decreases in intensity. Which photodetector receives a more intense or less intense signal depends on the direction in which the read beam 22 strays from the center of the information track 66. The phase difference between the signals provided from the first and second tracking photodetectors 112 and 116 represents the tracking error signal. The tracking servo subsystem 94 receives signals from the first and second tracking photodetectors 112 and 116 and acts to minimize the difference between them to thus keep the read beam 22 centered on the information track 66.

The differential tracking error signal generated in the first differential amplifier 140 is shown in line B of FIG. 5, and is a representation of the radial position of the read beam 22 on the disc 26. The differential tracking error signal output has a first maximum tracking error at a point indicated at 268 which is intermediate the center of the center information track 236 and the crossover point 248, and a second maximum tracking error at a point indicated at 272 which is intermediate the center of the center information track 236 and the crossover point 252. A third maximum tracking error is shown at a point indicated at 276 which is intermediate the center of the first information track 240 and the crossover point 248, and a fourth maximum tracking error is shown at a point indicated at 280 which is intermediate the center of the second information track 244 and the crossover point 252. Minimum tracking errors are shown at points indicated at 284, 288 and 292 corresponding to the center of the information tracks 240, 236 and 244 respectively. Minimum tracking errors are also shown at points indicated at 296 and 298 corresponding to the crossover points 248 and 252 respectively.

Figure 6:
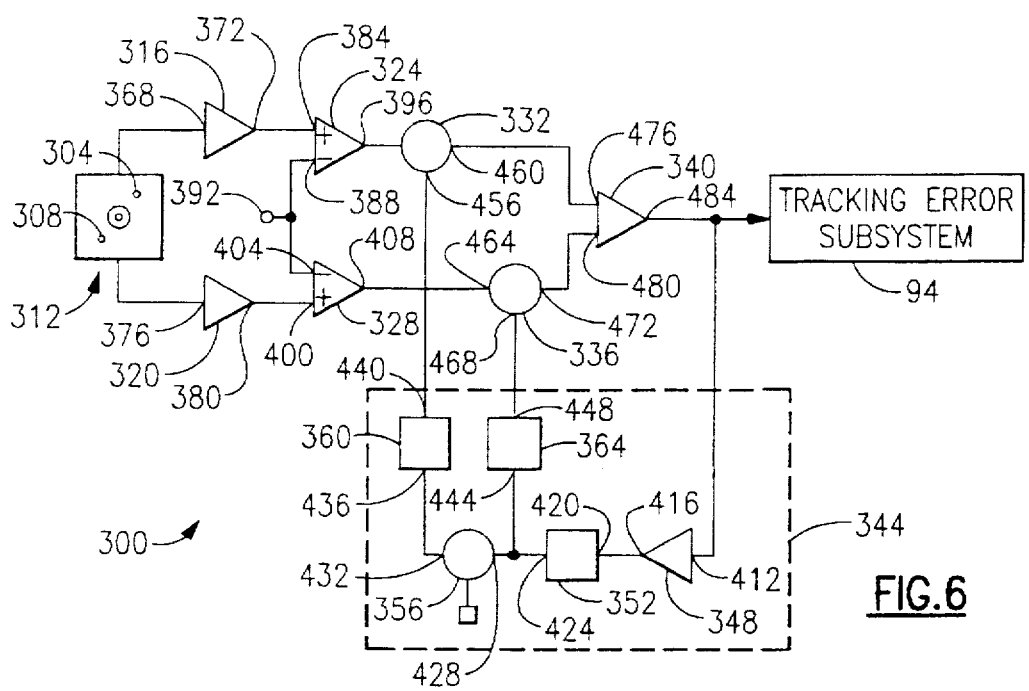
FIG. 6 is an electrical schematic of a portion of the apparatus shown in FIG. 1.

A tracking signal processing portion 300 of the signal processing subsystem 104 of the present invention is shown in FIG. 6. The tracking signal processing portion 300 receives tracking error signals from both a first tracking photodetector 304 and a second tracking photodetector 308 of a diode array 312 similar to the diode array 108 described with reference to FIG. 3. While not shown, the processing portion 300 could receive tracking error signals from other types of photodetectors such as a dual photodetector. The tracking signal processing portion 300 includes a first preamplifier 316, a second preamplifier 320, a first operational amplifier 324, a second operational amplifier 328, a first analog multiplier 332, a second analog multiplier 336 and a summing amplifier 340. The tracking signal processing portion 300 further includes a local feedback loop 344 comprising a third operational amplifier 348, a feedback loop compensation circuit 352, a phase shifter 356, and first and second sine function generators 360 and 364 respectively. The phase shifter 356 provides an offset voltage that results in a phase shift between the outputs of the sine function generators 360, 364.

The first preamplifier 316 has an input 368 and an output 372, and the second preamplifier 320 has an input 376 and an output 380. The first operational amplifier 324 has a positive first input 384 which is electrically connected to the output 372 of the first preamplifier 316, a negative second input 388 which is electrically connected to a positive voltage source 392, and an output 396. The second operational amplifier 328 has a positive first input 400 which is electrically connected to the output 380 of the second preamplifier 320, a negative second input 404 which is electrically connected to the voltage source 392, and an output 408.

Referring to the feedback portion 344 of the tracking signal processing portion 300, the third operational amplifier 348 has an input 412, and an output 416. The phase compensation circuit 352 has an input 420 which is electrically connected to the output 416 of the third operational amplifier 348, and to an output 424. The phase shifter 356 has an input 428 which is electrically connected to the output 424 of the phase compensation network 352, and to an output 432. The first sine function generator has an input 436 which is electrically connected to the output 432 of the phase shifter 356, and has an output 440, while the second sine function generator 364 has an input 444 which is electrically connected to the output 424 of the phase compensation network 352, and has an output 448.

The first analog multiplier 332 has a first input 452 which is electrically connected to the output 396 of the first operational amplifier 324, a second input 456 which is electrically connected to the output 440 of the first sine function generator 360, and an output 460. The second analog multiplier 336 has a first input 464 which is electrically connected to the output 408 of the second operational amplifier 328, a second input 468 which is electrically connected to the output 448 of the second sine function generator 364, and an output 472. The summing amplifier 340 has a first input 476 which is electrically connected to the output 460 of the first analog multiplier 332, a second input 480 which is electrically connected to the output 472 of the second analog multiplier 336, and to an output 484 which is electrically connected to both the input 412 of the third operational amplifier 348 and the tracking error subsystem 94.

The first preamplifier 316 receives a tracking signal output from the first tracking photodetector 304 at its input 368 while the second preamplifier 320 receives a tracking signal output from the second tracking detector 308 at its input 376. Both tracking signals are periodic signals when plotted as a function of radial position along the surface of the disc 26 and the two signals are approximately 90 degrees out of phase. The tracking signals output from the two tracking detectors 304 and 308 are each amplified and are then provided at the outputs 372 and 380 of the first and second preamplifiers 316 and 320 respectively.

The first operational amplifier 324, which receives the amplified tracking signal from the first preamplifier 316 at its positive input 384 and receives a positive voltage at its negative input 388, removes the common mode voltage of the tracking signal, and provides a larger proportion of the signal corresponding to the tracking error signal at its output 396. The second operational amplifier 328, which receives the amplified tracking signal from the second preamplifier 320 at its positive input 400 and receives a positive voltage at its negative input 404, removes the common mode voltage of the tracking signal and provides a larger proportion of the signal corresponding to the tracking error signal at its output 408.

The first multiplier 332 multiplies the tracking signal received from the output 396 of the first operational amplifier 324 with a feedback signal received from the output 440 of the first sine function generator 360. The resulting modified tracking signal is provided at the output 460 of the multiplier 332. The second multiplier 336 multiplies the tracking signal received from the output 408 of the second operational amplifier 328 with a feedback signal received from the output 448 of the second sine function generator 364. The resulting modified tracking signal is provided at the output 472 of the multiplier 336.

The summing amplifier 340 receives the modified tracking signals from the first and second multipliers 332 and 336 at its first and second inputs 476 and 480 respectively. Upon receiving these signals, the summing amplifier 340 adds them algebraically to generate a differential tracking error signal representing the phase difference between the two modified tracking signals. The differential tracking error signal is provided at the output 484 of the amplifier 340. The tracking error signal is then provided to the interrupt switch 200 of the tracking servo subsystem 94 (FIGS. 1, 4) as well as to the feedback portion 344 of the tracking signal processing portion 300.

The feedback portion 344 of the tracking signal processing portion 300 receives the differential tracking error signal at the first input 412 of the third operational or feedback amplifier 348. The feedback amplifier 348 amplifies the tracking error signal using a predetermined loop gain and provides the amplified signal to the input 420 of the feedback loop compensation circuit 352. The feedback loop compensation circuit 352 provides phase gain compensation for the amplified tracking error signal and provides the signal to both the input 444 of the second sine generator 364 and the input 436 of the phase shifter 356.

The phase shifter 356 provides a predetermined voltage offset to the tracking error signal received at its input 428 so that the signal provided at the input 436 of the first sine function generator 360 differs from the signal provided at the input 444 of the second sine function generator 364 by a predetermined voltage. The voltage offset introduced by the phase shifter 356 is selected to have a value that causes the output of the two sine function generators 360 and 364 to be ninety degrees out of phase. The effect of this phase shift is that the signal provided at the output 440 of the first sine function generator 360 is the same as what would be provided by a cosine generator if it were to operate on the signal provided at the output 424 of the phase compensation network 352. Thus, the signals output from the first and second sine function generators 360 and 364 are 90 degrees out of phase. While a phase difference of substantially 90 degrees is preferred, the invention can be practiced with other phase differences as well, within a range of approximately 30 degrees. The phase angle can thus be in a range of approximately 60 degrees to approximately 120 degrees. If the phase difference of the signals at the outputs 440, 448 is too large, the system may become unreliable.

Figure 7:
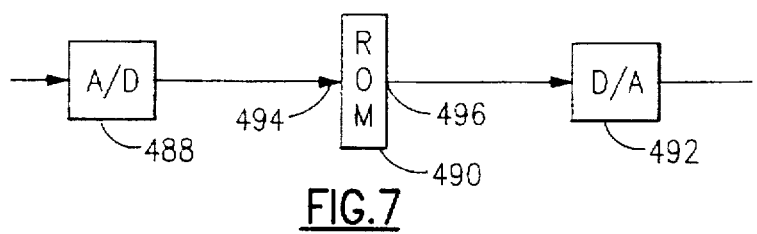
FIG. 7 is a block diagram of a sine function generator.
Figure 11:
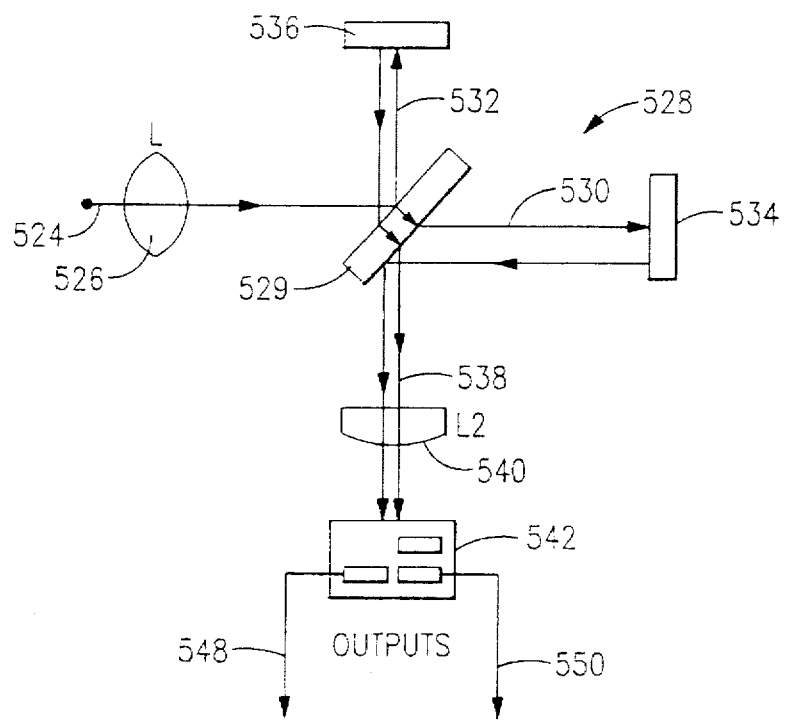
FIGS. 10 and 11 are schematic diagrams illustrating a particular embodiment of the invention.
Figure 12:
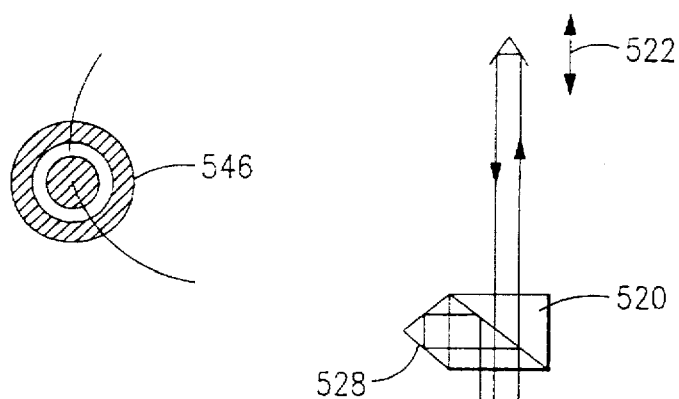
FIG. 12 illustrates a ring detector for use in the embodiment of FIGS. 10 and 11.
Figure 10:
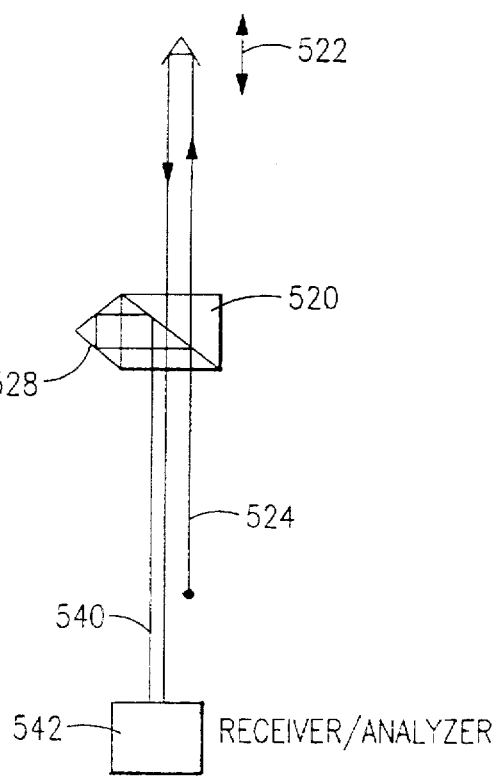

Both the first and second sine function generators 360 and 364 can be implemented in a variety of ways well known in the art. One such implementation is shown in FIG. 7, which shows a sine function generator comprising an analog-to-digital converter 488, a Read Only Memory look-up table 490 having a plurality of stored sine values, and a digital-to-analog converter 492. The signal provided at the input of the sine function generator is first converted to a digital signal by the converter 488, the Read Only Memory 490 receives this digital signal at its input 494 and generates a corresponding sine function value at its output 496. The sine function value is converted into an analog signal by the converter 492 and is provided at the output of the sine function generator.

Figure 4:
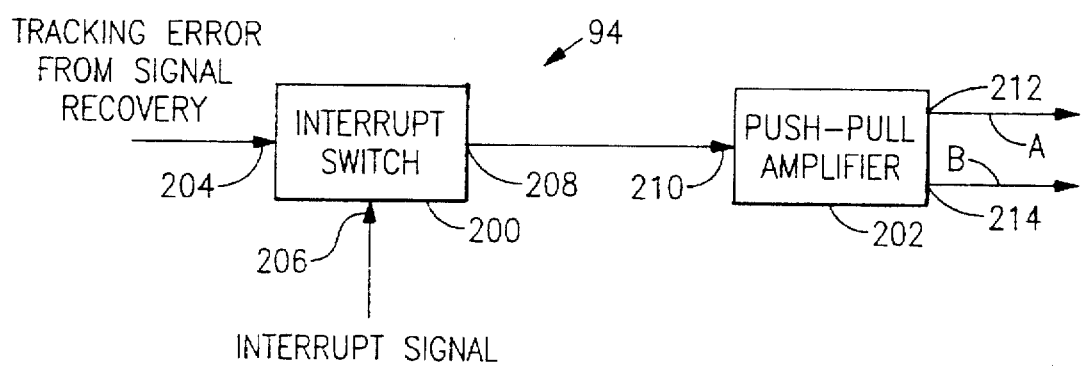
FIG. 4 is a diagram illustrating further details of the subsystem shown in FIG. 3.

The signal recovery subsystem 104 (FIG. 3), when operating with the tracking signal processing portion 300 of the present invention, continues to provide a tracking error signal to the tracking servo subsystem 94 (FIGS. 1, 4). The tracking servo subsystem 94 utilizes the tracking error signal to control the radial position of the read beam 22 by driving the inductor 52 in the same manner as described above. Thus, the tracking servo subsystem 94 operates to maintain the read beam 22 centered on an information track 66.

While the tracking servo subsystem 94 utilizes the provided tracking error signal in the same manner regardless of the tracking signal processing portion used in the signal recovery subsystem 104, the use of the tracking signal processing portion 300 results in a different tracking error signal being provided to the tracking servo subsystem 94. The tracking error signal provided when the tracking signal processing portion 300 is used remains periodic, but the use of the portion 300 causes each period of the tracking error signal to represent a greater range of locations on the optical disc 26.

FIG. 8 shows a comparison of the tracking error signals, each of which is a function of radial position, over a portion of the disc 26. A signal 512 is the tracking error signal generated by the signal recovery subsystem 104 using the prior art tracking signal processing portion 146, while a signal 516 is the tracking error signal generated by the signal recovery subsystem 104 using the tracking signal processing portion 300 of the present invention. Because the tracking error signal 516 is substantially linear in the region where its value is close to zero, that is halfway between its extremes, it can be said that the tracking signal processing portion 300 "linearizes" the tracking error signal. However, the signal 516 does remain periodic as can be seen in FIG. 9, which shows the value of the signal 516 over a greater portion of the disc 26. When the tracking signal processing portion 146 is used, each period of the tracking error signal 512 represents one information track 66 of the disc 26. However, when the tracking signal processing portion 300 is used, each period of the tracking error signal can be made to represent any number of information tracks 66.

The number of information tracks 66 represented in each period of the tracking error signal 516 is determined by the gain of the feedback amplifier 348. There are advantages to "linearizing" a large number of tracks 66. For example, after the local feedback loop 344 operates to linearize the tracking error transfer characteristics over several tracks, a noise pulse with a magnitude greater than one track is still within the operating range of the negative slope of the linearized error signal, which allows a normal response by the tracking error subsystem 94 to such a noise pulse. However, because the amplitude of the signal 516 is finite, the greater the number of tracks 66 represented in each period, the smaller the difference in voltage between each of the tracks 66. If the voltage difference between adjacent tracks 66 is too small, it may become difficult to distinguish between the tracks 66, and tracking errors might result. There is therefore a tradeoff in performance that must be made in choosing the number of tracks to be represented by each period of the tracking error signal 516.

The tracking servo 94 must operate within the negative feedback slope of the tracking error signal 516. This is because if a positive tracking error signal were provided, the tracking servo 94 would drive the inductor 52 so as to displace the beam 22 in a direction causing the tracking error to increase. The tracking error would continue to build, causing a malfunction. This is also true of the tracking servo response to the tracking error signal 512. Within the feedback portion 344 of the tracking signal processing portion 300 however, the use of positive feedback does not create any such problems. This is because the tracking signal processing portion 300 is self-correcting so that it always settles on the negative slope of the tracking error signal 516 regardless of whether a positive feedback signal is initially provided.

The values of the tracking signals provided by the first and second tracking photodetectors 304 and 308, taken together, represent a relative radial position of the read beam 22 on the disc 26. Further, the value of the signal provided to the feedback portion 344 of the tracking signal processing portion 300 represents a relative radial feedback position. The use of the feedback portion 344 minimizes the difference between the values of these two signals. Thus the tracking signal processing portion 300, through the use of the feedback portion 344, is able to restore the tracking error signal toward zero, a value that represents a particular radial position on the disc 26. This enables the tracking servo subsystem 94 to stabilize the read beam 22 so that it impinges upon a desired information track 66.

The signals provided by the first and second tracking photodetectors 304 and 308 are both periodic and are approximately ninety degrees out of phase. They can be represented by the functions sine and cosine.

For the purposes of the following discussion the photodetector is assumed to have two signal outputs in quadrature. The signal provided by the first tracking photodetector 304 to the first preamplifier 316 is defined as sin(x) and the signal provided by the second tracking photodetector 308 to the second preamplifier 320 is defined as sin(x+90) or cos(x), where x is the relative radial position of the read beam 22. The signal provided at the second input 468 of the second multiplier 336 is defined as sin(y) and the signal provided at the second input 456 of the first multiplier 332 is defined as sin(y+90) or cos(y), where y is the value of the relative radial feedback signal. Given these definitions, the signal at the output 460 of the first multiplier 332 is sin(x)cos(y) and the signal at the output 472 of the second multiplier 336 is cos(x)sin(y). Thus, the signal at the output 484 of the summing amplifier 340 is:

$$a[\sin(x)\cos(y)-\cos(x)\sin(y)]=a\ \sin(x-y)\approx a(x-y) \quad (2)$$

wherein a is a constant gain factor. As is known in the art, for values of x−y near zero, sin(x−y) is approximately x−y.

Therefore, for values of x−y near zero, the tracking error signal, a(sin(x−y)) is substantially linear. The relationship of x and y can be adjusted for a given application by appropriate settings of the gain of the feedback amplifier 348.

In a specific embodiment of the present invention, the second sine function generator 364 can be replaced by a cosine function generator, which receives the signal provided at the output 424 of the phase compensation network 352. The use of a cosine function generator in this embodiment eliminates the need for the use of the phase shifter 356.

Referring now to FIGS. 6, 10, 11 and 12, in a specific embodiment of the invention, the inputs to the preamplifiers 316, 320 are developed by an optical pickup link which includes an optical subsystem, here represented by prism 520. A source beam 524 is passed through a lens 526, and is received by a conventional interferometer 528 having a plate 529 for separating the source beam into two beams 530, 532, which reflect from mirrors 534, 536 respectively. The prism 520 and a portion of the interferometer 528 are movable relative to one another in the directions indicated by the double-headed arrow 522. As a consequence of the relative motion thereof, the fringe patterns developed by the interferometer vary. The reflected beams recombine as beam 538, which is collimated by a lens 540. The beam 538 then reaches a receiver/analyzer 542. The fringe patterns transmitted in the beam 538 are measured by a quadrature photodetector 546, which can be a ring photodetector, and which is typically disposed within the receiver/analyzer 542. The analog outputs 548, 550 of the photodetector 546 are then presented to the preamplifiers 316, 320 (FIG. 6).

Referring again to FIGS. 1 and 3, it has been disclosed hereinabove that the embodiments disclosed above result in an error signal for a servo circuit; however in certain applications, wherein it is only desired to measure the position or other characteristic of an object, the error signal produced by the signal processing portion 146 need not be provided to a servo circuit, but can be connected to another user of the information, for example a computer, or a measurement indicator. In this case the tracking servo 94 and the beam deflecting means symbolized by the inductor 52 can be omitted.

Figure 13:
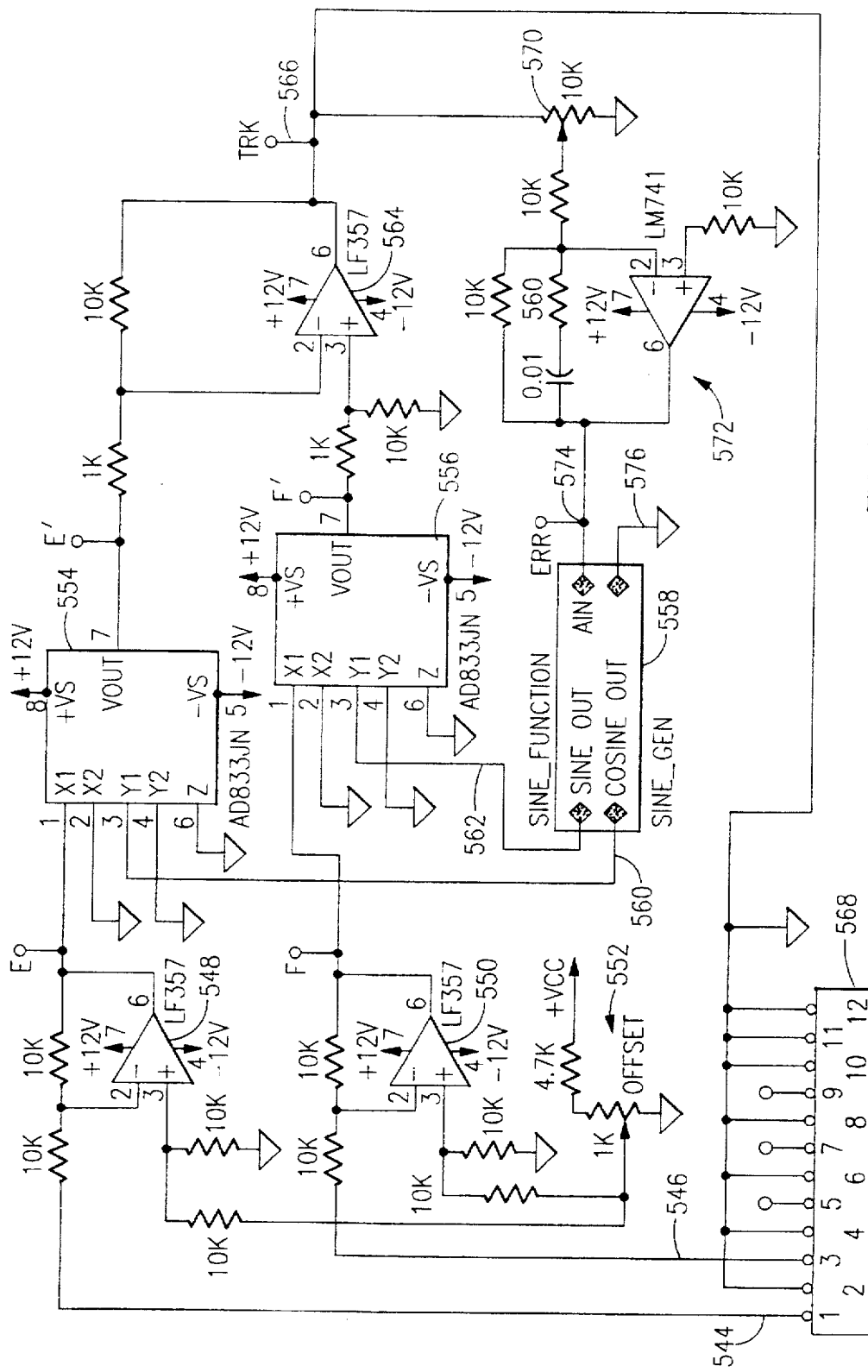
FIG. 13 is an electrical schematic of a preferred embodiment of the invention.

An implementation of the circuitry illustrated in FIG. 6 is disclosed with reference to FIG. 13. Tracking signals 544, 546 received from the photodetectors of an optical pickup link are in a generally quadrature relationship, and are connected to inputs of differential amplifiers 548, 550 respectively. The outputs of the differential amplifiers 548, 550 represent respective differences between their input signals 548, 550 and an offset voltage which is produced by a voltage divider 552. The outputs of the differential amplifiers 548, 550 are inputs of multipliers 554 and 556 respectively.

A function generator 558 produces a cosine function output 560, and a sine function output 562, which are respective second inputs of the multipliers 554, 556. A summing amplifier 564 receives the outputs of the multipliers 554, 556, and generates a tracking signal 566. The tracking signal 566 is coupled back to the optical pickup via a connector 568 for insertion into its servo tracking loop. The tracking signal 566 is also coupled to a potentiometer 570, which adjusts the local feedback loop gain. From the potentiometer 570, the tracking signal 566 is connected to a compensation circuit 572, the purpose of which is to provide phase and gain compensation in order to maintain loop stability. The function generator 558 receives a first input 574 from the compensation circuit 572, and a second grounded input 576.

Figure 14B:
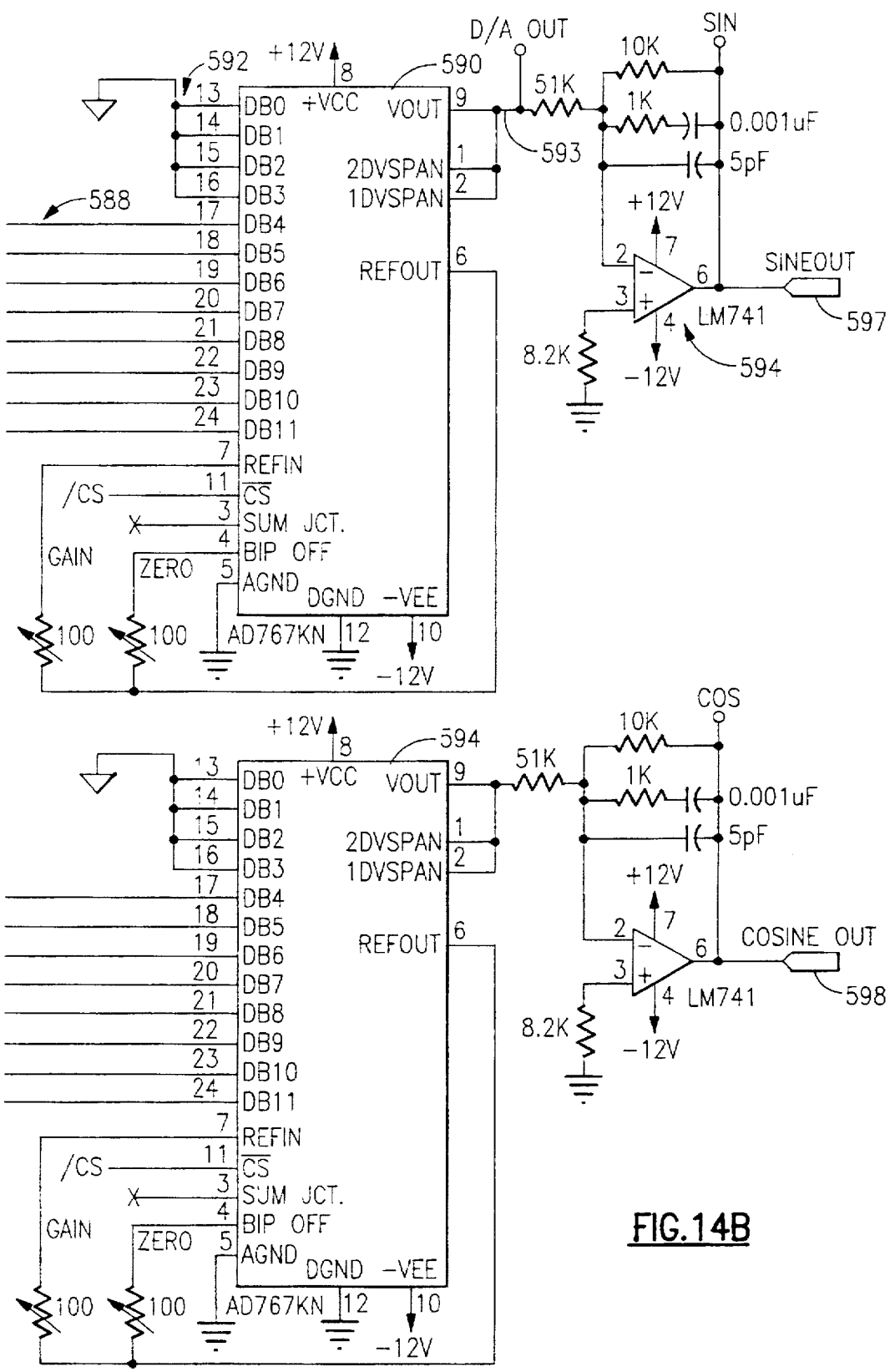
FIG. 14 is a detailed electrical schematic illustrating the function generator shown in the schematic of FIG. 13.

FIG. 14 illustrates the function generator 558 in greater detail. An analog-to-digital converter 580, preferably an AD779KN, receives the inputs 574, 576 (FIG. 13), and supplies two structurally identical units, generally referenced 585, 595. The unit 585 generates a sine function, and the unit 595 generates a cosine function. In the interest of brevity, only the unit 585 will be described. The outputs 583 of the analog-to-digital converter 580 are connected to the address lines 587 of an erasable programmable memory 582. In this embodiment the analog-to-digital converter 580 has a higher bit resolution than is required, and the least significant bit position 586 is therefore grounded. The outputs 583 thus provide a vector into the erasable programmable memory 582, and a corresponding sine value is output on data lines 588. The sine value represented by the signal on lines 588 is then converted to an analog signal in a digital-to-analog converter 590, which can be an AD767KN. The four least significant positions 592 of the digital-to-analog converter 590 are grounded, as it has a higher resolution than is required. The analog output 593 is coupled to a filter circuit 594, the purpose of which is to attenuate the signal in order to eliminate aliasing.

The unit 595 differs from the unit 585 only in that a different data set is stored in its erasable programmable memory 586, in order to generate a cosine function. Preferably the data is programmed such that when zero volts are input to the units 585, 595 by the analog-to-digital converter 580, the outputs 597, 598 have voltages of equal magnitude, preferably 0.7 volts.

In programming the erasable programmable memories 582, 597, it is necessary to compensate for the fact that the analog-to-digital converter 580 generates two's complementary signals, which are not sequential or linear as seen by the erasable programmable memories 582, 597. Adjustment of the data in the memories is therefore necessary in order to generate true sine and cosine functions. The computer programs listings in Appendices 1 and 2 can be executed to produce suitable data for programming the erasable programmable memories 582, 597.

Figure 15:
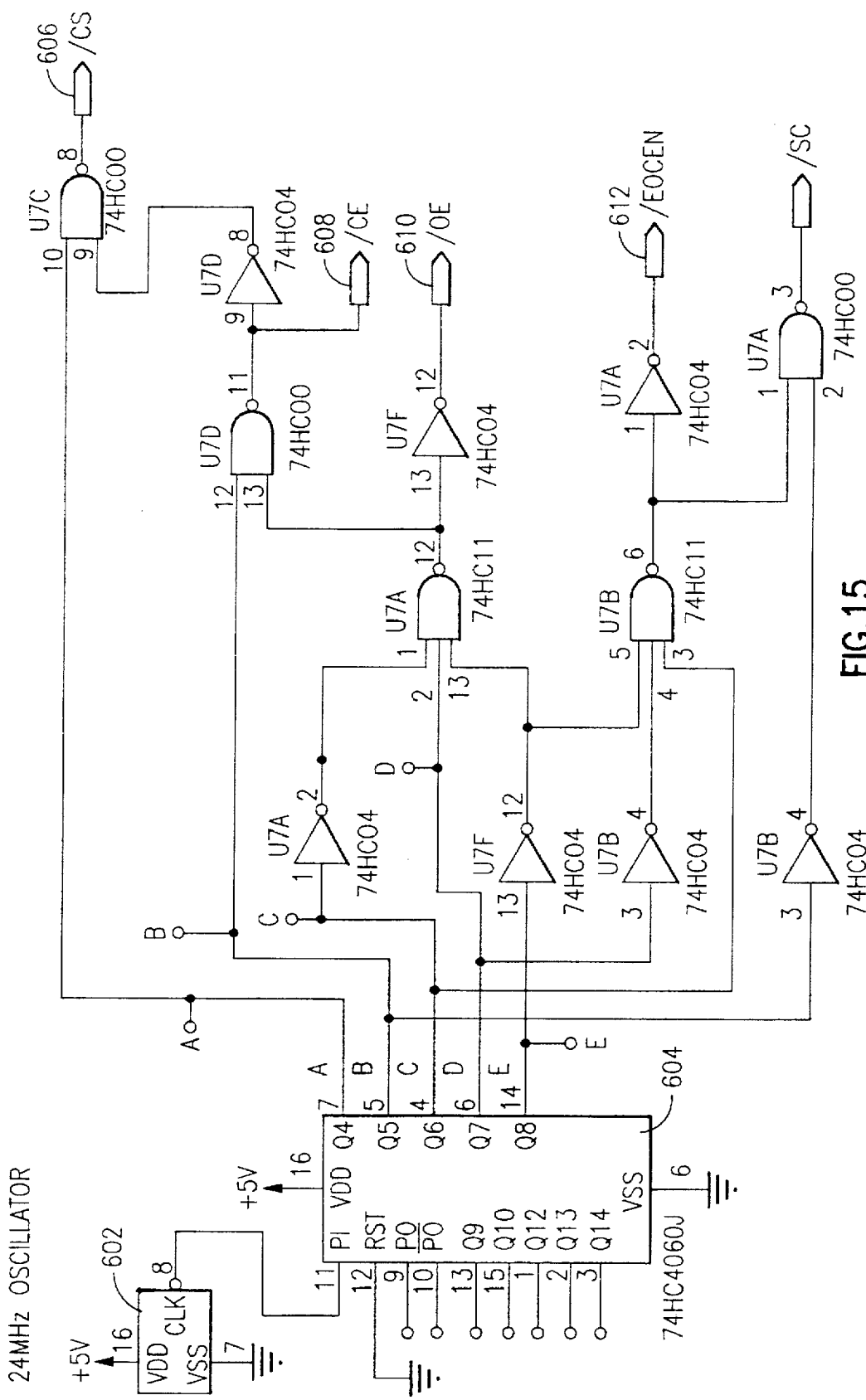
FIG. 15 is a detailed electrical schematic illustrating the timing circuitry of the circuitry shown in FIG. 13.

Conventional timing signals required for the function of the integrated circuits in FIG. 14 are provided by a timing block 600, which is illustrated in further detail in FIG. 15. A crystal oscillator 602 operates at 24 mHz, and is coupled to a counter 604, which can be a 74HC4060J. Timing signals developed by the block 600 include a chip select signal 606, chip enable signal 608, output enable signal 610, and a conversion enable signal 612.

While this invention has been explained with reference to the structure disclosed herein, it is not confined to the details set forth and this application is intended to cover any modifications and changes as may come within the scope of the following claims;

Appendix 1 Page 1

APPENDIX 1

```
'+------------------------------------------------+
'| All copyrights reserved by DiscoVision Associates 3/08/1996  |
'| Program written by Ludwig Ceshkovsky.           |
'|                                                 |
'| This program generates Sine and Cosine data for an EEPROM with |
'| input values in the 2's complements format. The output data   |
'| is tabulated sequentially by the address of the EEPROM with the |
'| output format using binary offset for bipolar output.         |
'|                                                 |
'+------------------------------------------------+

DECLARE SUB SaveData (n AS INTEGER)

DIM SHARED n AS INTEGER    ' total number of memory locations
DIM SHARED Cy!             ' total Number of Cycles
DIM SHARED Cstep!          ' value of each step
DIM SHARED Degree!
DIM SHARED PROM%           'the word width of the output prom
DIM SHARED chksum AS LONG  'chksum for binary data file
CONST sine = 1, cose = 2
CONST PI = 3.141592654#
Degree! = PI / 180    'Scales to one Degree from radiance '----------------- user selectable parameters -----------------
Cy! = 32
PROM% = 8              '8 bit wide prom
PromSize% = 13         'Number of address lines 13 for 8K PROM
'--------------------end-------------------------- n = 2 ^ PromSize%      'total number of address locations
ByScale% = (2 ^ PROM%) / 2
SizeScale = n / 2      'offset calculation for bipolar output Cstep! = ((Cy! * 360) / n) * Degree!    ' cycles per step address
offset! = Degree! * 45 'with zero volts in make the sine = cosine
DIM SHARED PROM%(n + 1, 2)

CLS
Range = INT(n / 2)
chksum = 0
'----------------data file for prom programmer----------------

PRINT n, Range, Cstep!, Degree!, Cy!, ByScale% ' test parameters
PRINT

OPEN "PROM01.dat" FOR OUTPUT AS #2
'PRINT #2, "EEPROM data "; DATE$; TIME$; " of Revision"
PRINT #2, CHR$(2); "$A0000,";

' the for next loop is not split to order the address' not required
' the address's are coded in two's complement and the output data is
' is coded in binary offset because the AD779 A/D output is two's complement
' and the AD767 D/A is binary offset.Not binary offset but output offset.
K = -1
```

Appendix 1 Page 2

```
FOR i% = 1 - Range TO Range ' low and High order address combined
    K = K + 1
    ' the 1.72 is a fine adj. to make the sine and the cosine same
    Asine% = ByScale% + SIN(offset! + ((i% - 1) * Cstep)) * (ByScale% - 1)
    Acosine% = ByScale% + COS(offset! + ((i% - 1) * Cstep)) * (ByScale% - 1)

' compute two's complement addressing mode for the PROM

IF i% < 0 THEN addr = ABS(i%) + SizeScale ELSE addr = (i%)

PROM%(K, sine) = Asine%: PROM%(K, cose) = Acosine% ' store values

' PRINT HEX$(addr), HEX$(Asine%), HEX$(Acosine%)
    chksum = chksum + Asine%
    ' PRINT #2, HEX$(addr), HEX$(Asine%)

IF (K MOD 128) = 0 THEN PRINT #2,
    IF Asine% < 16 THEN PRINT #2, HEX$(0);
    PRINT #2, HEX$(Asine%); " ";

NEXT i%
    PRINT K; " = TOTAL MEMORY LOCATIONS"
    PRINT #2,
    PRINT #2, CHR$(3); "$S"; HEX$(chksum); ","
    PRINT #2, CLOSE #2
'---------------------------test file for vissim---------------------------
    OPEN "PROM01.TXT" FOR OUTPUT AS #2
    'PRINT #2, "EEPROM data "; DATE$; TIME$; " of Revision"
    PRINT #2,
    FOR i% = 0 TO K
        PRINT i%, PROM%(i%, sine), PROM%(i%, cose)
        PRINT #2, i%, PROM%(i%, sine), PROM%(i%, cose)
    NEXT i%
    CLOSE #2

END:

SaveData (n)

SUB SaveData (n AS INTEGER)
DEFINT A-Z
'SaveData:
    ' Save the PROM data in a file PROM01.dat" data file.
    OPEN "PROM01.dat" FOR OUTPUT AS #2
    PRINT #2, "EEPROM data "; date; " of Revision"

FOR a = 1 TO n
        ' PRINT #2, account(a).Title
    NEXT a
    CLOSE #2
END SUB
```

Appendix 2 Page 1

APPENDIX 2

```
'+-----------------------------------------------------------+
'|  All copyrights reserved by DiscoVision Associates 3/08/1996  |
'|  Program written by Ludwig Ceshkovsky.                    |
'|                                                           |
'|  This program generates Sine and Cosine data for an EEPROM with  |
'|  input values in the 2's complements format. The output data   |
'|  is tabulated sequentially by the address of the EEPROM with the  |
'|  output format using binary offset for bipolar output.    |
'|  COSINE OUTPUT                                            |
'+-----------------------------------------------------------+

DECLARE SUB SaveData (n AS INTEGER)

DIM SHARED n AS INTEGER  ' total number of memory locations
DIM SHARED Cy!           ' total Number of Cycles
DIM SHARED Cstep!        ' value of each step
DIM SHARED Degree!
DIM SHARED PROM%         'the word width of the output prom
DIM SHARED chksum AS LONG   'chksum for binary data file
CONST sine = 1, cose = 2
CONST PI = 3.141592654#
Degree! = PI / 180       'Scales to one Degree from radiance '----------------- user selectable parameters -----------------
Cy! = 32
PROM% = 8            '8 bit wide prom
PromSize% = 13       'Number of address lines 13 for 8K PROM
'-----------------------end----------------------- n = 2 ^ PromSize%        'total number of address locations
ByScale% = (2 ^ PROM%) / 2
SizeScale = n / 2        'offset calculation for bipolar output Cstep! = ((Cy! * 360) / n) * Degree!   ' cycles per step address
offset! = Degree! * 45 'with zero volts in make the sine = cosine
DIM SHARED PROM%(n + 1, 2)

CLS
Range = INT(n / 2)
chksum = 0
'-----------------data file for prom programmer-----------------

PRINT n, Range, Cstep!, Degree!, Cy!, ByScale% ' test parameters
PRINT

OPEN "PROM01.dat" FOR OUTPUT AS #2
'PRINT #2, "EEPROM data "; DATE$; TIME$; " of Revision"
PRINT #2, CHR$(2); "$A0000,";

' the for next loop is not split to order the address' not required
' the address's are coded in two's complement and the output data is
' is coded in binary offset because the AD779 A/D output is two's complement
' and the AD767 D/A is binary offset.Not binary offset but output offset.
K = -1
```

Appendix 2 Page 2

```
FOR i% = 1 - Range TO Range ' low  and High order address combined
    K = K + 1
    ' the 1.72 is a fine adj. to make the sine and the cosine same
    Asine% = ByScale% + SIN(offset! + ((i% - 1) * Cstep)) * (ByScale% - 1)
    Acosine% = ByScale% + COS(offset! + ((i% - 1) * Cstep)) * (ByScale% - 1)

' compute two's complement addressing mode for the PROM

IF i% < 0 THEN addr = ABS(i%) + SizeScale ELSE addr = (i%)

PROM%(K, sine) = Asine%: PROM%(K, cose) = Acosine% ' store values

' PRINT HEX$(addr), HEX$(Asine%), HEX$(Acosine%)
    chksum = chksum + Acosine%
    ' PRINT #2, HEX$(addr), HEX$(Acosine%)

IF (K MOD 128) = 0 THEN PRINT #2,
    IF Acosine% < 16 THEN PRINT #2, HEX$(0);
    PRINT #2, HEX$(Acosine%); " ";

NEXT i%
    PRINT K; " = TOTAL MEMORY LOCATIONS"
    PRINT #2,
    PRINT #2, CHR$(3); "$S"; HEX$(chksum); ","
    PRINT #2, CLOSE #2
'-------------------------test file for vissim-------------------
    OPEN "PROM01.TXT" FOR OUTPUT AS #2
    'PRINT #2, "EEPROM data "; DATE$; TIME$; " of Revision"
    PRINT #2,
    FOR i% = 0 TO K
        PRINT i%, PROM%(i%, sine), PROM%(i%, cose)
        PRINT #2, i%, PROM%(i%, sine), PROM%(i%, cose)
    NEXT i%
    CLOSE #2

END:

SaveData (n)

SUB SaveData (n AS INTEGER)

DEFINT A-Z
'SaveData:
' Save the PROM data in a file PROM01.dat" data file.
    OPEN "PROM01.dat" FOR OUTPUT AS #2
    PRINT #2, "EEPROM data "; date; " of Revision"
    FOR a = 1 TO n
        ' PRINT #2, account(a).Title
    NEXT a
    CLOSE #2
END SUB
```

What is claimed is:

1. An apparatus for detecting an object using a beam of radiant energy, comprising:
    a source for directing a beam of radiant energy onto an object;
    a detector of said beam having first and second outputs responsive to a position of said beam relative the object;
    a circuit coupled to said outputs of said detector for producing an error signal representing a displacement of said beam from a predetermined position, wherein said error signal has a periodic characteristic relative to said displacement;
    a local feedback loop coupled to said outputs of said detector, said loop comprising:
        a first periodic function generator responsive to said error signal; and
        a second periodic function generator responsive to said error signal, said second periodic function generator having an output that differs from an output of said first periodic function generator by a phase angle;
        a first multiplier for multiplying said first output of said detector by said output of said first periodic function generator; and
        a second multiplier for multiplying said second output of said detector by said output of said second periodic function generator;
    wherein said outputs of said first and second multipliers are provided as inputs of said circuit.

2. The apparatus according to claim 1, wherein said periodic characteristic is substantially sinusoidal, and said first periodic function generator and said second periodic function generator are sine generators.

3. The apparatus according to claim 1, wherein said first and second outputs of said detector have an approximate mutual quadrature relationship with respect to said displacement of said beam and said phase angle is approximately ninety degrees.

4. The apparatus according to claim 1, wherein said first and second detection signals have an approximate mutual quadrature relationship with respect to said displacement of said beam.

5. The apparatus according to claim 4, wherein said phase angle is in a range of approximately 60 degrees to approximately 120 degrees.

6. The apparatus according to claim 5, wherein said phase angle is approximately 90 degrees.

7. The apparatus according to claim 1, wherein said detector comprises an interferometer.

8. An apparatus for control of a beam of radiant energy, comprising:
    a detector of said beam having first and second outputs responsive to a position of said beam;
    a circuit coupled to said outputs of said detector for producing an error signal representing a displacement of said beam from a predetermined position, wherein said error signal has a periodic characteristic relative to said displacement;
    a servo responsive to said error signal for restoring said displaced beam to said predetermined position;
    a local feedback loop coupled to said outputs of said detector, said loop comprising:
        a first periodic function generator responsive to said error signal; and
        a second periodic function generator responsive to said error signal, said second periodic function generator having an output that differs from an output of said first periodic function generator by a phase angle;
        a first multiplier for multiplying said first output of said detector by said output of said first periodic function generator; and
        a second multiplier for multiplying said second output of said detector by said output of said second periodic function generator;
    wherein said outputs of said first and second multipliers are provided as inputs of said circuit.

9. The apparatus according to claim 8, wherein said periodic characteristic is substantially sinusoidal, and said first periodic function generator and said second periodic function generator are sine generators.

10. The apparatus according to claim 8, wherein said first and second outputs of said detector have an approximate mutual quadrature relationship with respect to said displacement of said beam and said phase angle is approximately ninety degrees.

11. The apparatus according to claim 8, wherein said first and second detection signals have an approximate mutual quadrature relationship with respect to said displacement of said beam.

12. The apparatus according to claim 11, wherein said phase angle is in a range of approximately 60 degrees to approximately 120 degrees.

13. The apparatus according to claim 12, wherein said phase angle is approximately 90 degrees.

14. The apparatus according to claim 8, wherein said detector comprises an interferometer.

15. A method for controlling a beam of radiant energy, comprising the steps of:
    generating first and second detection signals responsive to a position of said beam;
    producing an error signal representing a displacement of said beam from a predetermined position, wherein said error signal has a periodic characteristic relative to said displacement;
    restoring said displaced beam to said predetermined position in response to said error signal; and
    generating a first periodic signal responsive to said error signal; and
    generating a second periodic signal responsive to said error signal, said second periodic signal differing from said first periodic signal by a phase angle;
    wherein said step of producing an error signal is performed by the steps of:
        multiplying said first detection signal by said first periodic signal to yield a first product signal;
        multiplying said second detection signal by said second periodic signal to yield a second product signal; and
        determining a difference between said first product signal and said second product signal.

16. The method according to claim 15, wherein said first and second detection signals, and said first and second periodic signals are substantially sinusoidal.

17. A tracking control apparatus for an optical disc system, comprising:
    a source for directing a beam of radiant energy toward a selected one of a plurality of information tracks of an optical disc;
    means for imparting relative rotational motion between said beam and said disc about an axis of rotation;
    a beam steering means for displacing the beam in a generally radial direction relative said disc to follow said selected information track;

a detector responsive to radiant energy returning from said selected information track and having a first output signal and a second output signal, wherein said first output signal differs in phase from said second output signal according to a displacement of said beam from said selected track;

a first multiplier electrically having a first input coupled to said first output signal of said detector;

a second multiplier electrically having a first input coupled to said second output signal of said detector;

a difference summing amplifier having a first input coupled to an output of said first multiplier and a second input coupled to an output of said second multiplier for generating an error signal;

a first periodic function generator having an input coupled to an output of said difference summing amplifier and an output coupled to a second input of said first multiplier;

a second periodic function generator having an input coupled to an output of said difference summing amplifier and an output coupled to a second input of said second multiplier; and a servo responsive to said output of said difference summing amplifier for operating said beam steering means.

18. The apparatus according to claim 17, wherein said first output signal and said second output signal differ in phase by a range of approximately 60 degrees to approximately 120 degrees.

19. The apparatus according to claim 18, wherein said first output signal and said second output signal differ in phase by approximately 90 degrees.

20. The apparatus according to claim 17, further comprising:

a loop gain amplifier coupled to said output of said difference summing amplifier generating an amplified error signal; and a feedback loop compensation circuit coupled to said loop gain amplifier that provides phase gain compensation for said amplified error signal.

21. The apparatus according to claim 20, further comprising a phase shifter coupled to said loop compensation circuit and coupled to one of said first periodic function generator and said second periodic function generator, wherein said phase shifter provides a predetermined voltage offset to said error signal.

22. The apparatus according to claim 21, wherein said first periodic function generator and said second periodic function generator are sine generator.

23. The apparatus according to claim 17, wherein said first periodic function generator and said second periodic function generator are sine generators.

24. The apparatus according to claim 17, wherein said detector comprises an interferometer.

25. A method for tracking control in an optical disc system, comprising the steps of:

directing a beam of radiant energy toward a selected one of a plurality of information tracks of an optical disc;

imparting relative rotational motion between said beam and said disc about an axis of rotation;

displacing the beam in a generally radial direction relative said disc to follow said selected information track;

detecting radiant energy returning from said selected information track and generating a first output signal and a second output signal, wherein said first output signal differs in phase from said second output signal according to a displacement of said beam from said selected track;

multiplying said first output signal by a first periodic function of an error signal to yield a first product;

multiplying said second output signal by a second periodic function of said error signal to yield a second product;

subtracting said first product from said second product to produce said error signal; and steering said beam toward said selected information track in accordance with said error signal.

26. The method according to claim 25, wherein said first output signal and said second output signal differ in phase by a range of approximately 60 degrees to approximately 120 degrees.

27. The method according to claim 26, wherein said first output signal and said second output signal differ in phase by approximately 90 degrees.

28. The method according to claim 25 wherein said first periodic function is a first sine and said second periodic function is a second sine differing in phase from said first sine.

29. The method according to claim 25 wherein said first periodic function is a sine and said second periodic function is a cosine.

30. The method according to claim 25, wherein said step of generating a first output signal and a second output signal comprises measuring an interference pattern in the beam.

* * * * *

UNITED STATES PATENT AND TRADEMARK OFFICE
CERTIFICATE OF CORRECTION

PATENT NO. : 5,689,485
DATED : November 18, 1997
INVENTOR(S) : Ludwig Ceshkovsky It is certified that error appears in the above-identified patent and that said Letters Patent is hereby corrected as shown below:

Col. 2, line 6, delete "amp" after "The" and before "waveform"
and insert --ramp--- in place thereof.

Col. 2, line 26, delete "amp" after "the" and before "extends"
and insert --ramp--- in place thereof.

Signed and Sealed this

Seventeenth Day of August, 1999

Attest:

Q. TODD DICKINSON

Attesting Officer

Acting Commissioner of Patents and Trademarks